US011402855B2

(12) United States Patent
Yamashita

(10) Patent No.: US 11,402,855 B2
(45) Date of Patent: Aug. 2, 2022

(54) PROCESSING DEVICE, DRIVE CONTROL DEVICE, DATA PROCESSING METHOD, AND STORAGE MEDIUM FOR ATTITUDE CONTROL OF MOVING BODY BASED ON WIND CONDITIONS

(71) Applicant: NEC Corporation, Tokyo (JP)

(72) Inventor: Toshiaki Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 16/631,486

(22) PCT Filed: Jul. 21, 2017

(86) PCT No.: PCT/JP2017/026401
§ 371 (c)(1),
(2) Date: Jan. 16, 2020

(87) PCT Pub. No.: WO2019/016930
PCT Pub. Date: Jan. 24, 2019

(65) Prior Publication Data
US 2020/0183425 A1 Jun. 11, 2020

(51) Int. Cl.
*G05D 1/08* (2006.01)
*B64D 47/08* (2006.01)
(Continued)

(52) U.S. Cl.
CPC ........... *G05D 1/0808* (2013.01); *B64D 47/08* (2013.01); *G01L 5/00* (2013.01); *B64C 39/024* (2013.01);
(Continued)

(58) Field of Classification Search
CPC ........ G05D 1/0808; B64D 47/08; G01L 5/00; B64C 39/024; B64C 2201/027; B64C 2201/127; B64C 2201/141
See application file for complete search history.

(56) References Cited

U.S. PATENT DOCUMENTS 9,540,100 B2 * 1/2017 Dekel ................. G05D 1/0808
9,663,236 B1 * 5/2017 Shiosaki ............. G05D 1/0858
(Continued)

FOREIGN PATENT DOCUMENTS

CN 102163059 A 8/2011
CN 105488296 A 4/2016
(Continued)

OTHER PUBLICATIONS

Neumann et al., "Real-time wind estimation on a micro unmanned aerial vehicle using its inertial measurement unit", Oct. 2015, Elsevier, Sensors and Actuators A:physical, whole document (Year: 2015).*

(Continued)

*Primary Examiner* — Peter D Nolan
*Assistant Examiner* — Kenneth M Dunne
(74) *Attorney, Agent, or Firm* — Sughrue Mion, PLLC

(57) ABSTRACT

This data processing device is provided with: an acceleration acquisition unit that acquires the acceleration of a moving body equipped with a mechanism for generating a propulsion force and equipped with a measuring instrument for measuring the strength of at least a one-direction component of the wind to which the moving body is exposed; a wind information acquisition unit that acquires wind information indicating the blowing direction of the wind and the strength of the wind, both of which are identified from the values measured by the measuring instrument; an external force estimation unit that estimates, on the basis of the acceleration and the direction and magnitude of the propulsion force, the magnitude of an external force exerted by the wind on the moving body; and a generation unit that generates relational information indicating the relation between the wind strength and the estimated magnitude of the external force.

14 Claims, 13 Drawing Sheets

(51) Int. Cl.
    *G01L 5/00*     (2006.01)
    *B64C 39/02*     (2006.01)

(52) U.S. Cl.
    CPC .. *B64C 2201/027* (2013.01); *B64C 2201/127* (2013.01); *B64C 2201/141* (2013.01)

(56) References Cited

U.S. PATENT DOCUMENTS

| | | |
|---|---|---|
| 2014/0129057 A1 | 5/2014 | Hall et al. |
| 2015/0057844 A1* | 2/2015 | Callou ................. B64C 39/024 701/3 |
| 2017/0199527 A1* | 7/2017 | Chandra ............... G05D 1/0011 |
| 2017/0212529 A1 | 7/2017 | Kumar et al. |
| 2017/0349258 A1 | 12/2017 | Kishimoto et al. |
| 2019/0265732 A1* | 8/2019 | Arwatz ................ G05D 1/0816 |
| 2020/0233439 A1* | 7/2020 | Ivanov ................ G08G 5/0069 |

FOREIGN PATENT DOCUMENTS

| | | | | |
|---|---|---|---|---|
| DE | 102015121517 B4 * | 8/2017 | ............... | G01P 5/00 |
| FR | 2926637 A1 | 7/2009 | | |
| JP | 2006-306254 A | 11/2006 | | |
| JP | 4882678 B2 * | 2/2012 | | |
| JP | 2012-179968 A | 9/2012 | | |
| JP | 2014-113905 A | 6/2014 | | |
| JP | 2015-514263 A | 5/2015 | | |
| JP | 2016-043922 A | 4/2016 | | |
| JP | 6029446 B2 | 11/2016 | | |
| JP | 2016-540211 A | 12/2016 | | |
| WO | WO-2011014712 A2 * | 2/2011 | ............. | F03D 7/048 |
| WO | 2013/144508 A1 | 10/2013 | | |
| WO | 2016/104031 A1 | 6/2016 | | |
| WO | WO-2019158222 A1 * | 8/2019 | ............. | G01P 5/001 |

OTHER PUBLICATIONS

Roy Streit, "Real-Time Wind Speed Estimation and Compensation for Improved Flight", Apr. 2014, IEEE, IEEE Transcations on Aerospace and Electronic Systems vol. 50 No. 2, whole document (Year: 2014).*
Bruschi et al, "Wind speed and direction detection by means of solid-state anemometers embedded on small quadcopters", Elsevier, Procedia Engineering 168(2016) 802-805, Whole document (Year: 2016).*
Javier Moyano Cano, "Quadrotor UAV for wind profile characterization", 2013, University of Carlos III of Madrid. (Year: 2013).*
Extended European Search Report for EP Application No. EP17918681.2 dated Apr. 15, 2020.
Javier Gonzalez-Rocha et al., "Measuring Atmospheric Winds from Quadrotor Motion", AIAA Atmospheric Flight Mechanics Conference, Jan. 5, 2017, XP055680177, Reston, Virginia, USA DOI: 10.2514/6.2017-1189 ISBN: 978-1-62410-448-0.
Steven L. Waslander et al. , "Wind Disturbance Estimation and Rejection for Quadrotor Position Control", AIAA Infotech@Aerospace Conference and AIAA; Seattle, Washington, USA, Apr. 1, 2009, pp. 1-14, XP009164233.
Dave Zachariah et al., "Self-motion and wind velocity estimation for small-scale UAVs", Robotics and Automation (ICRA), 2011 IEEE International Conference on IEEE, May 9, 2011, pp. 1166-1171, XP032033550, DOI: 10.1109/ICPA.2011.5979676 ISBN:978-1-61284-386-5, USA.
International Search Report for PCT Application No. PCT/JP2017/026401, dated Oct. 17, 2017.
English translation of Written opinion for PCT Application No. PCT/JP2017/026401.
Chinese Office Action for CN Application No. 201780093354.7 dated Jan. 28, 2021 with English Translation.

* cited by examiner

Fig. 7

| TIME | PITCH ANGLE [deg] | PRO-PULSIVE FORCE Ft [N] | PROPULSIVE FORCE [N] | | ACCELERATION [m/s²] | | RESULTANT [N] | | EXTERNAL FORCE [N] | | WIND SPEED [m/s] | |
|---|---|---|---|---|---|---|---|---|---|---|---|---|
| | | | x DIRECTION COMPONENT $Fd_x$ | z DIRECTION COMPONENT $Fd_z$ | x DIRECTION COMPONENT $a_x$ | z DIRECTION COMPONENT $a_z$ | x DIRECTION COMPONENT $F_x$ | z DIRECTION COMPONENT $F_z$ | x DIRECTION COMPONENT $Fw_x$ | z DIRECTION COMPONENT $Fw_z$ | x DIRECTION COMPONENT $W_x$ | z DIRECTION COMPONENT $W_z$ |
| 0:00:00 | 2.50 | 9.81 | 0.428 | −9.801 | −0.917 | +0.161 | −0.917 | +0.161 | −1.345 | +0.156 | −7.22 | +0.94 |
| 0:00:10 | 5.00 | 9.95 | 0.867 | −9.912 | −0.621 | +0.080 | −0.621 | +0.080 | −1.488 | +0.186 | −7.82 | +1.01 |
| 0:00:20 | 6.30 | 10.05 | 1.103 | −9.989 | −0.395 | +0.005 | −0.395 | +0.005 | −1.498 | +0.188 | −8.03 | +1.02 |
| 0:00:30 | 8.60 | 10.10 | 1.510 | −9.986 | +0.008 | +0.007 | +0.008 | +0.007 | −1.502 | +0.187 | −8.10 | +1.01 |
| ... | | | | | | | | | | | | |

PROCESSING DEVICE, DRIVE CONTROL DEVICE, DATA PROCESSING METHOD, AND STORAGE MEDIUM FOR ATTITUDE CONTROL OF MOVING BODY BASED ON WIND CONDITIONS

This application is a National Stage Entry of PCT/JP2017/026401 filed on Jul. 21, 2017, the contents of all of which are incorporated herein by reference, in their entirety.

TECHNICAL FIELD

The present disclosure relates to processing of data related to a force that a moving body receives.

BACKGROUND ART

A service using a small moving body, such as a multirotor helicopter, has been developed actively. In order to suitably achieve various services by the small moving body, a technique for appropriately performing control (hereinafter, also referred to as "movement control") related to movement of the moving body is important. PTLs 1 to 4 disclose a technique related to movement control for a flight object.

PTL 1 discloses an autonomous flight robot that follows an intruder who enters a monitoring region while adjusting a flight height, and captures the intruder.

PTL 2 discloses a system for controlling an autonomous flight of a small flight object by using information from a plurality of sensors such as a camera, a laser scanner, a global positioning system (GPS) transceiver, and accelerometer.

PTL 3 discloses a technique capable of reducing an influence of a side wind when a flight object travels on a bridge and the like by devising a structure and a movement method of the flight object.

PTL 4 discloses an automatic flight control device that estimates a vector (airspeed) of wind an aircraft receives during flight, and generates a ground speed target signal based on the estimated vector.

Further, in regards to movement of a moving body that travels on the ground or across the sea, a technique for performing control with consideration given to disturbance is disclosed in PTLs 5 to 7.

The technique disclosed in PTLs 5 and 6 is a technique for performing movement control mainly on a ship. This technique stabilizes the movement control on a ship by detecting a wind direction and controlling a direction of a ship in such a way that a direction of a bow (a direction of a propulsive force) is opposed to the detected wind direction.

The technique disclosed in PTL 7 is a technique related to movement control on a vehicle. A disturbance suppression control system disclosed in PTL 7 detects wind strength, calls a driver's attention, and performs control that cancels a force in a horizontal direction exerted on a vehicle by the wind.

CITATION LIST

Patent Literature

[PTL 1] Japanese Patent No. 6029446
[PTL 2] Japanese Unexamined Patent Application Publication No. 2016-540211
[PTL 3] Japanese Unexamined Patent Application Publication No. 2016-043922
[PTL 4] Japanese Unexamined Patent Application Publication No. 2006-306254
[PTL 5] International Patent Publication No. 2016/104031
[PTL 6] Japanese Unexamined Patent Application Publication No. 2012-179968
[PTL 7] Japanese Unexamined Patent Application Publication No. 2014-113905

SUMMARY OF INVENTION

Technical Problem

Since the small moving body is particularly more susceptible to an influence of wind, it is important to more accurately perceive the influence of the wind on the moving body in order to minutely perform control related to movement of the small moving body.

PTLs 1, 2, and 3 do not include description related to performing a measurement, estimation, or the like for a direction and wind strength.

PTLs 5 and 6 describe control based on a wind direction, but do not specifically describe what kind of processing is performed according to wind strength. At least the techniques described in PTLs 5 and 6 cannot specify the extent of a propulsive force to which a force the moving body receives from wind actually correspond.

PTLs 4 and 7 describe a technique for deriving, from a vector of a detected (or an estimated) wind, a control signal that cancels out an influence of the wind by a formula based on aerodynamics. However, a prepared formula is not necessarily applied well to an actual situation. In order to derive a more accurate control signal, it is more desirable to use information indicating a relationship between wind the moving body receives actually and an influence of the wind according to circumstances than using a predetermined formula.

One of objects of the present invention is to provide a data processing device, a data processing method, and the like, being capable of accurately perceiving an influence of wind on a moving body from information acquired from a moving body.

Solution to Problem

A data processing device recited in the present invention, as an aspect, includes:

an acceleration acquisition unit that acquires acceleration of a moving body, the moving body including a mechanism that generates a propulsive force, and a measuring instrument that measures strength of at least one direction component of wind received by the moving body;

a wind information acquisition unit that acquires wind information about a wind direction and a wind strength, the wind direction and the wind strength being specified by using a measured value measured by the measuring instrument;

an external force estimation unit that estimates magnitude of an external force based on the acceleration, and a direction and magnitude of the propulsive force, the external force being force that the moving body receives from the wind; and a generation unit that generates relationship information, the relationship information being an information about a relationship between the wind strength and the estimated magnitude of the external force.

A data processing method recited in the present invention, as an aspect, includes:

acquiring acceleration of a moving body, the moving body including a mechanism that generates a propulsive force and a measuring instrument that measures strength of at least one direction component of wind received by the moving body;

acquiring wind information about a wind direction and a wind strength, the wind direction and the wind strength being specified by using a measured value measured by the measuring instrument;

estimating magnitude of an external force based on the acceleration, and a direction and magnitude of the propulsive force, the external force being force that the moving body receives from the wind; and generating relationship information, the relationship information being an information about a relationship between the wind strength and the estimated magnitude of the external force.

A program recited in the present invention, as an aspect, causes a computer to execute:

acquiring acceleration of a moving body including a mechanism for generating a propulsive force and a measuring instrument that measures strength of at least one direction component of wind received by the moving body;

acquiring wind information which is identified from a value measured by the measuring instrument the wind information being an information indicating a direction in which the wind blows and strength of the wind;

estimating magnitude of an external force that the moving body receives from the wind based on the acceleration, and a direction and magnitude of the propulsive force; and generating relationship information, the relationship information being an information indicating a relationship between the strength of the wind and the magnitude of the estimated external force.

Advantageous Effects of Invention

The present invention is able to accurately perceive an influence of wind on the moving body from information acquired from the moving body.

BRIEF DESCRIPTION OF DRAWINGS

FIG. 7 is a diagram illustrating an example of data stored in a storage unit.

EXAMPLE EMBODIMENT

Hereinafter, example embodiments according to the present invention will be described in detail with reference to drawings.

Note that, "x" represents a computation of a product, and "I" represents division in the present disclosure.

First Example Embodiment

First, a first example embodiment according to the present invention will be described. The first example embodiment is an example embodiment in which a data processing device 11 is applied to a flying object 1a as illustrated in FIG. 1.

Figure 1:
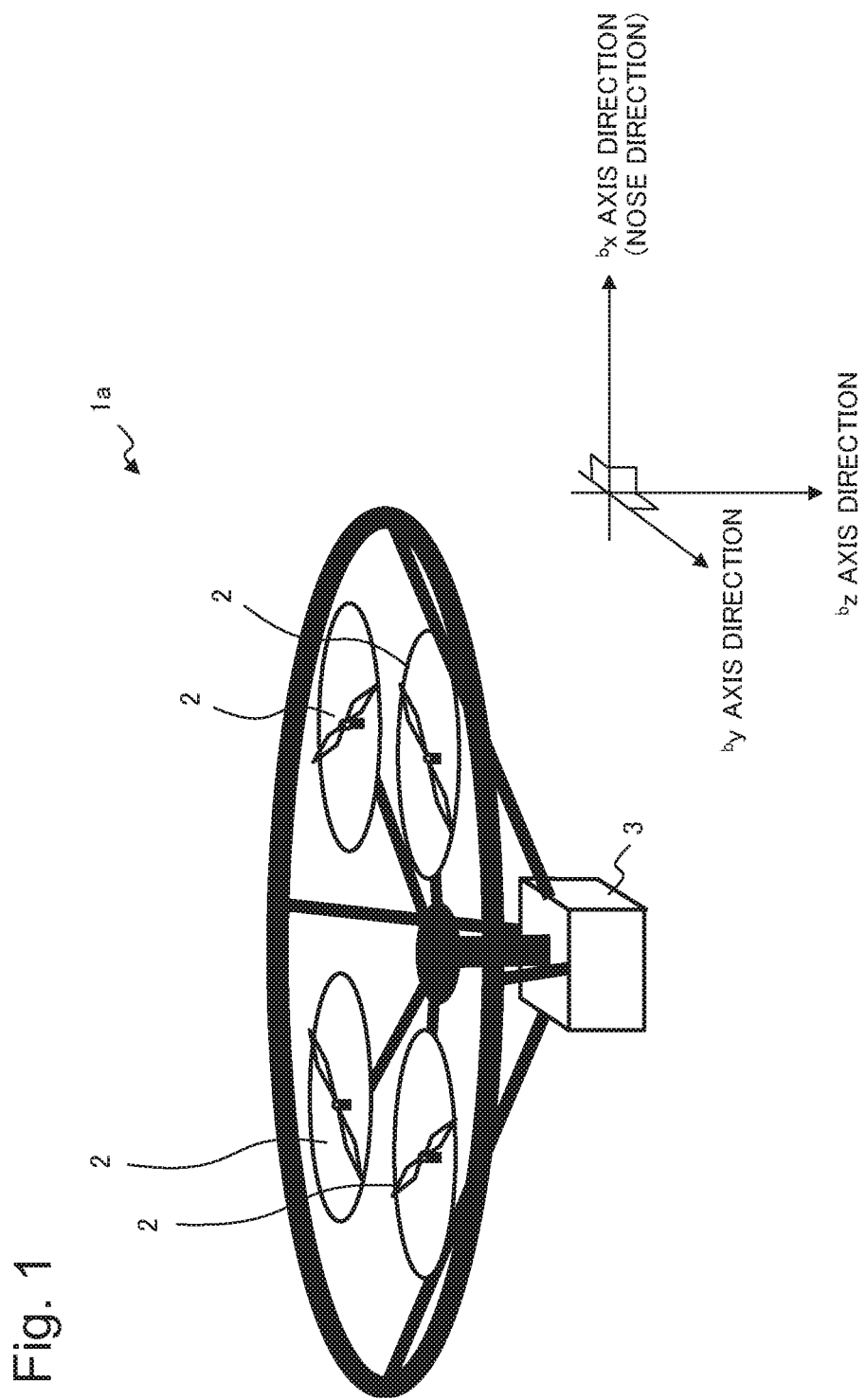
FIG. 1 is a schematic diagram illustrating an example of a flying object according to a first example embodiment of the present invention.

FIG. 1 is a schematic diagram illustrating an example of the flying object 1a equipped with a housing 3 including the data processing device 11. However, a three-dimensional structure of the flying object 1a is not limited to a structure exemplified in FIG. 1.

The flying object 1a is, for example, a multicopter (also referred to as a multirotor helicopter, a multirotor, and the like). A multicopter without human on board is also referred to as an unmanned aerial vehicle (UAV), a small unmanned aircraft, or a drone.

Note that, in the following description, a three-dimensional coordinate system fixed to the flying object 1a with the center of gravity of the flying object 1a as an origin is adopted as a coordinate system applied to the flying object 1a. The three-dimensional coordinate system is represented by three axes of a $^b$x axis, a $^b$y axis, and a $^b$z axis orthogonal to each other. The $^b$z axis coincides with a direction of gravity applied to the center of gravity of the flying object 1a when the flying object 1a is not tilted (that is, when the flying object 1a flies in such a way that a position of the flying object 1a in a windless state is stationary). The $^b$x axis coincides with a nose direction of the flying object 1a. Note that, the nose direction is a direction being a reference for the flying object 1a. The nose direction may change at any time (see a modification example <2> described later), but it is assumed that the nose direction is predetermined for the flying object 1a in the description of the present example embodiment below.

<Configuration>

As illustrated in FIG. 1, the flying object 1a includes a rotor blade 2 and the housing 3.

The rotor blade 2 is a member that changes a propulsive force and an attitude of the flying object 1a. In the example illustrated in FIG. 1, there are four rotor blades 2. The flying object 1a acquires the propulsive force and a rotational force (torque) by rotating the rotor blade 2. For example, the four rotor blades 2 are rotated at an equal rotational speed, and thus the flying object 1a acquires the propulsive force to a negative direction of the $^b$z axis. When there is no disturbance at all, and a direction of the propulsive force is a vertically upward direction and the propulsive force is equal to gravity applied to the flying object 1a, a position of the flying object 1a is stationary. Further, when the four rotor blades 2 vary in rotational speed, the flying object 1a can be tilted and can rotate about the $^b$z axis. Note that, the rotor blade 2 is rotated by an actuator 9. The rotation of the rotor blade 2 is controlled by a drive control device 21 described later.

When the flying object 1a is tilted, the direction of the propulsive force is not the vertically upward direction, and thus the flying object 1a acquires the propulsive force having a component of a horizontal direction. A tilted direction is not limited, but it is assumed that the flying object 1a is tilted about the $^b$y axis when the drive control device 21 tilts the flying object 1a in the example of the present example embodiment. A nose is directed downward with respect a horizontal plane by the tilt about the $^b$y axis, and thus the flying object 1a acquires the propulsive force having a horizontal component in a direction in which the nose is directed.

The housing 3 houses a device that performs information processing related to the flying object 1a.

Figure 2:
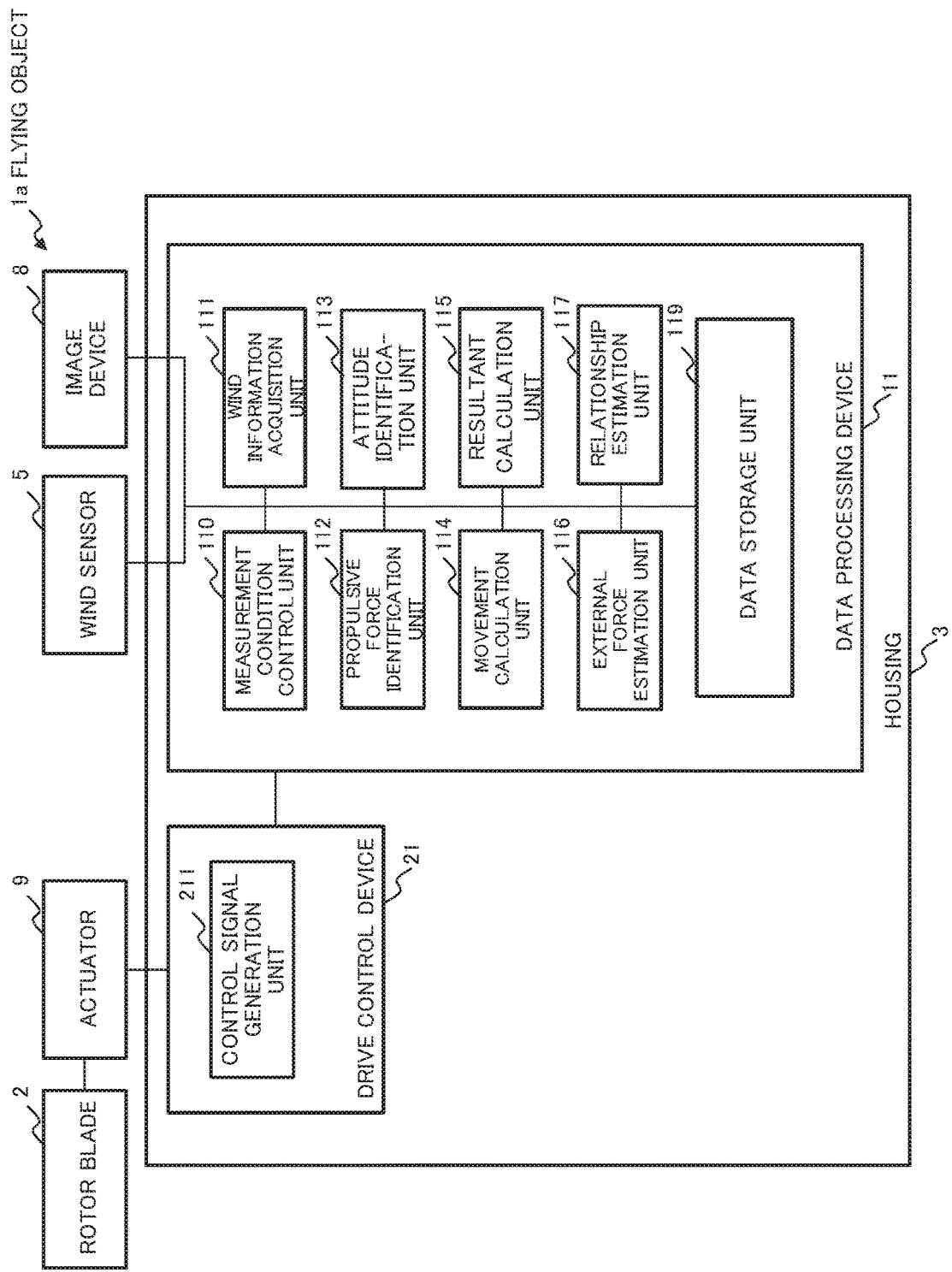
FIG. 2 is a block diagram illustrating a configuration of the flying object according to the first example embodiment.

FIG. 2 is a block diagram illustrating a configuration of the flying object 1a. As illustrated in FIG. 2, the flying object 1a includes a wind sensor 5, an image device 8, the drive control device 21, and the data processing device 11 in addition to the rotor blade 2 and the actuator 9 that rotates the rotor blade 2. As illustrated in FIG. 2, for example, the drive control device 21 and the data processing device 11 are included in the housing 3, and the wind sensor 5 and the image device 8 are located outside the housing 3.

[Drive Control Device 21]

The drive control device 21 controls the propulsive force and the attitude of the flying object 1a by controlling a rotational drive of the rotor blade 2.

The drive control device 21 can control the following manners, for example.

Magnitude of the propulsive force generated in the flying object 1a

An amount of rotation (a bearing in which a nose is directed) about the $^b$y axis of the flying object 1a An angle (an inclination with respect to the horizontal direction, a pitch angle) at which a nose is lowered Specifically, the drive control device 21 includes a control signal generation unit 211.

The control signal generation unit 211 generates a control signal for controlling the propulsive force and the attitude of the flying object 1a. Specifically, the control signal generation unit 211 generates a control signal for controlling a rotational speed of each of the four rotor blades 2 of the flying object 1a in such a way as to set the propulsive force and the attitude to a target propulsive force and a target attitude.

The control signal generation unit 211 may acquire the target propulsive force and the target attitude from a control instruction acquired by communication from the outside of the flying object 1a. Alternatively, the control signal generation unit 211 may acquire the target propulsive force and the target attitude from a control instruction by a component that is mounted on the flying object 1a and generates the control instruction, such as a measurement condition control unit 110 and a propulsive vector derivation unit 222 according to a third example embodiment, which are described later.

The drive control device 21 controls the propulsive force and the attitude of the flying object 1a by transmitting the control signal generated by the control signal generation unit 211 to the actuator 9.

[Wind Sensor 5]

The wind sensor 5 is a measuring instrument that measures wind strength. Specifically, the wind sensor 5 is mounted on the flying object 1a, and measures wind strength the flying object 1a receives. A unit of a value (hereinafter, a measurement value) measured by the wind sensor 5 may be any of "m/s", "knot", and "m$^3$/min", for example, and may be other than these. The measurement value may be a value quantitatively indicating wind strength received by the wind sensor 5. Examples of the wind sensor 5 include an anemometer, an airflow meter, a manometer, a microphone (that acquires volume changing in accordance with wind strength), and the like.

Since the wind sensor 5 is mounted on the flying object 1a, wind the wind sensor 5 receives is wind the flying object 1a receives.

Figure 3:
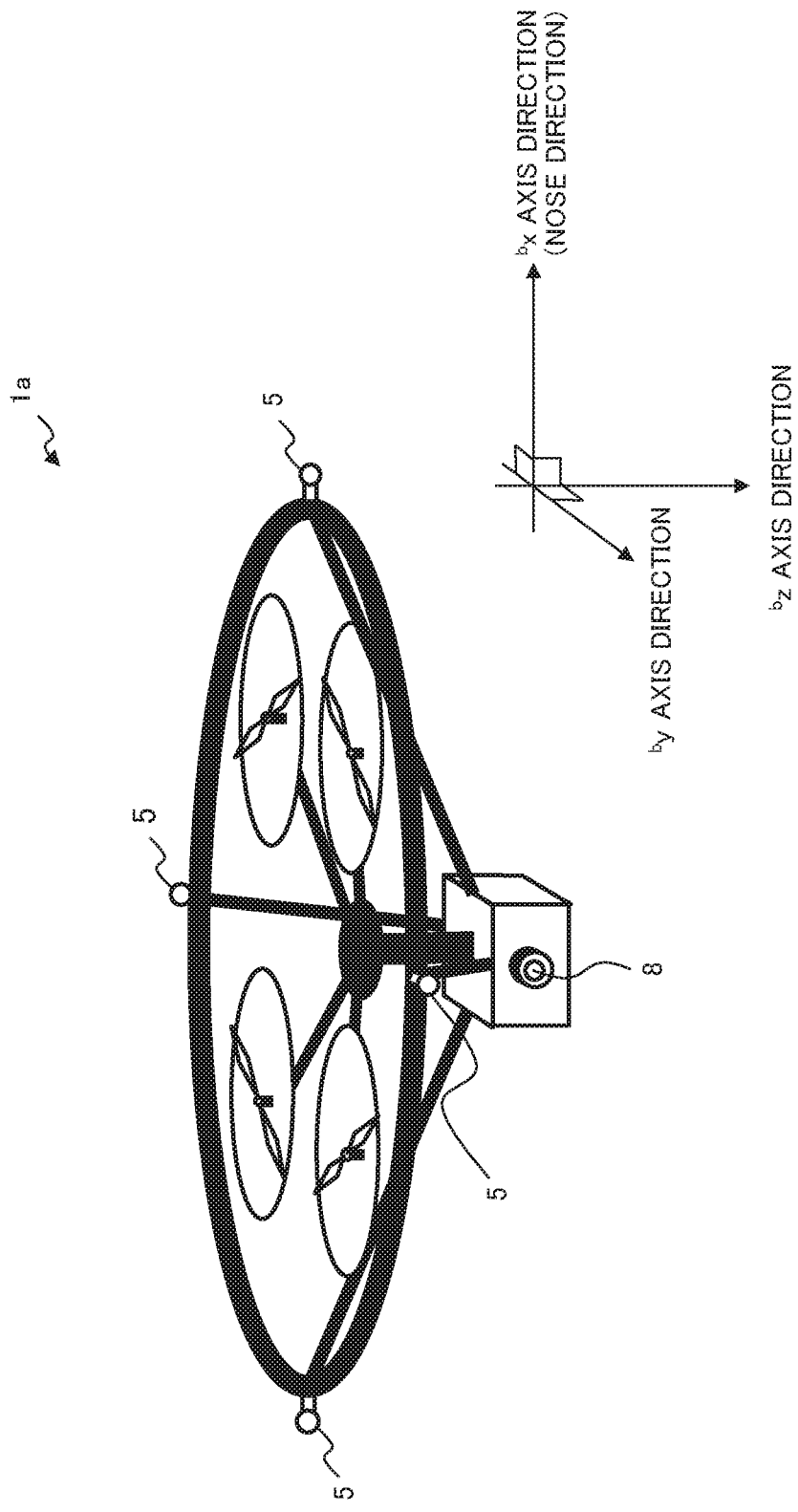
FIG. 3 is a schematic diagram illustrating an example of positions of a wind sensor and an image device in the flying object.

The plurality of wind sensors 5 may be mounted on the flying object 1a. FIG. 3 illustrates an example of arrangement of the wind sensor 5 mounted on the flying object 1a according to the present example embodiment. As illustrated in FIG. 3, the four wind sensors 5 may be disposed on the flying object 1a in such a way as to be symmetrical (in such a way as to have rotational symmetry) about the $^b$z axis direction. Accuracy of wind information described later may be improved by acquiring measurement values of the plurality of wind sensors 5.

Sensitivity of a measurement by the wind sensor 5 may have directivity. In other words, the wind sensor 5 may be a measuring instrument that measures a component of a specific wind direction the wind sensor 5 receives. In the following description, the specific direction is referred to as a "measurement direction".

In the example illustrated in FIG. 3, one of the four wind sensors 5 is attached to the flying object 1a in such a way that a measurement direction of the wind sensor 5 is the $^b$x axis direction.

The wind sensor 5 may be a measuring instrument capable of independently measuring a direction and wind strength.

The wind sensor 5 transmits a measurement value to the data processing device 11. The measurement value is used by the measurement condition control unit 110 and a wind information acquisition unit 111 in the data processing device 11.

[Image Device 8]

The image device 8 is a device that captures image. The image device 8 is, for example, a camera. The image device 8 acquires a moving image, for example, by continuously capturing an image capturing range of the image device 8 at a predetermined frame rate. The image device 8 may acquire a still image based on an image capturing command that designates timing of image capturing. The image capturing command may be received from a circuit that is included in the housing 3 or the image device 8 and generates the image capturing command, or may be received remotely from the outside of the flying object 1a. When the image is captured based on the image capturing command, the image device 8 captures the image at least three points in time, and acquires an image at each of the points in time.

The image device 8 transmits, to the data processing device 11, the image (hereinafter referred to as "captured image") acquired by the image device 8 together with information about a time at which the captured image is acquired.

FIG. 3 illustrates an example of a positional relationship between the flying object 1a and the image device 8 according to the present example embodiment. The image device 8 captures image in the $^b$y axis direction, for example. When the image is captured in the $^b$y axis direction, and thus a nose is tilted and the flying object 1a moves on a plane including the $^b$x axis and the $^b$z axis, the image capturing range slides to a direction perpendicular to an image capturing direction (that is, a change in captured image is the greatest).

[Data Processing Device 11]

Hereinafter, a configuration included in the data processing device 11 will be described with reference to FIG. 2. The data processing device 11 includes the measurement condition control unit 110, the wind information acquisition unit 111, a propulsive force identification unit 112, an attitude identification unit 113, a movement calculation unit 114, a resultant calculation unit 115, an external force estimation unit 116, a relationship estimation unit 117, and a data storage unit 119.

As described later, the measurement condition control unit 110, the wind information acquisition unit 111, the propulsive force identification unit 112, the attitude identification unit 113, the movement calculation unit 114, the resultant calculation unit 115, the external force estimation unit 116, and the relationship estimation unit 117 may be constituted of a computer including one or a plurality of processors that execute a command based on a program, and a memory, for example.

The data storage unit 119 temporarily or non-temporarily stores data handled by the data processing device 11. The data storage unit 119 is a so-called working memory. The data storage unit 119 may be a nonvolatile storage medium. Data can be freely written to and read from the data storage unit 119 by another component included in the data processing device 11.

The data storage unit 119 may hold data in a format of a table that associates a measurement value measured by the wind sensor 5 with various information (such as the attitude, the propulsive force, acquired acceleration, an estimated resultant, and an estimated external force) related to a situation of the flying object 1a at a point in time at which the measurement value is measured, for example.

The measurement condition control unit 110 controls a condition of a measurement of data. Specifically, the measurement condition control unit 110 controls timing at which each unit of the data processing device 11 processes data such as the measurement value by the wind sensor 5 and the captured image by the image device 8, and a signal generated in the drive control device 21.

The wind information acquisition unit 111 acquires the wind information based on the measurement value of the wind sensor 5. The wind information is information indicating a direction and wind strength received by the flying object 1a. Note that, the "wind direction" is a direction in which wind blows (blows and travels) in the present disclosure. The wind direction is not limited to the horizontal direction.

For example, when the wind sensor 5 is the measuring instrument that measures a wind direction and strength of the wind, similarly to a wind wave and anemometer, a measurement value (that also includes information about the direction in this case) measured by the wind sensor 5 may be acquired as the wind information as it is. However, the wind information acquisition unit 111 may set an average value of measurement values in a predetermined time range as the wind information.

When the wind sensor 5 is the measuring instrument that measures only wind strength in a specific measurement direction, the wind information acquisition unit 111 may identify the direction and strength of the wind from measurement values acquired in a plurality of measurement directions. In theory, the direction and wind strength can be identified with the measurement value indicating wind strength of each of three linearly independent directional components. In a case where the plurality of wind sensors 5 varying in measurement direction are mounted on the flying object 1a, the wind information acquisition unit 111 may use the measurement value by each of the wind sensors 5. In a case where only one wind sensor 5 is mounted on the flying object 1a, the wind information acquisition unit 111 may acquire a plurality of measurement values including at least measurement values indicating wind strength of three linearly independent directional components by acquiring the measurement value by the wind sensor 5 when the flying object 1a has a different attitude.

Note that, information about a wind direction may be indicated by a direction based on the coordinate system of the flying object 1a, or may be indicated by a direction based on the coordinate system of a three-dimensional space of a real space.

The propulsive force identification unit 112 identifies the propulsive force of the flying object 1a. Since the drive control device 21 controls the propulsive force of the flying object 1a, the propulsive force identification unit 112 may identify the propulsive force by acquiring the control signal generated by the control signal generation unit 211 of the drive control device 21. A unit of the propulsive force is, for example, a "newton". The propulsive force identification unit 112 may hold information indicating a relationship between the control signal generated by the control signal generation unit 211 and the propulsive force, and use the information for identifying the propulsive force. For example, it is assumed that the control signal generated by the control signal generation unit 211 includes information indicating a rotational speed of the rotor blade 2. When a relationship between respective rotational speeds ($\omega_1$, $\omega_2$, $\omega_3$, $\omega_4$ [rotation/second]) of the four rotor blades 2 and the propulsive force (Fd [N]) is indicated as Fd=K×($\omega_1$, $\omega_2$, $\omega_3$, $\omega_4$) by using a coefficient K, for example, the propulsive force identification unit 112 can identify a value of the propulsive force Fd based on the control signal and the value of the coefficient K.

Note that, the "propulsive force" indicates a propulsive force generated by the flying object 1a itself in the present example embodiment. A force received from wind is distinguished as an "external force".

The propulsive force identification unit 112 writes information about the identified propulsive force to the data storage unit 119. The propulsive force identification unit 112 may transmit the information about the identified propulsive force to a component of the data processing device 11 that uses the information.

The attitude identification unit 113 identifies the attitude of the flying object 1a. Since the drive control device 21 controls the attitude of the flying object 1a, the attitude identification unit 113 may identify the attitude by acquiring the control signal generated by the control signal generation unit 211 of the drive control device 21.

Note that, it is assumed that the attitude of the flying object 1a is not changed by wind in the present example embodiment. In one example embodiment, when a change in attitude of the flying object 1a by wind is taken into consideration, the attitude identification unit 113 may identify the attitude by using information different from the control signal generated by the control signal generation unit 211, for example.

The attitude identification unit 113 may also identify the attitude of the flying object 1a by a gyrosensor, for example. Alternatively, the attitude identification unit 113 may identify the attitude of the flying object 1a based on the captured image by the image device 8, for example. The attitude identification unit 113 may identify an attitude of the flying object 1a by a method capable of detecting a tilt in addition to the methods described above.

The movement calculation unit 114 calculates an amount of movement of the flying object 1a and a variation amount of a speed based on the captured image acquired by the image device 8. Then, the movement calculation unit 114 acquires acceleration of the flying object 1a by estimation.

First, the movement calculation unit 114 calculates, for example, a motion vector based on the captured image acquired at each of two or more different points in time. And the movement calculation unit 114 estimates an amount of movement of the flying object 1a based on the calculated motion vector. Specifically, the movement calculation unit 114 calculates the amount of movement (the motion vector) of the position in the captured image of a specific point (that may be a plurality of specific points and may be a region or an object) included in the captured image. The specific point may be a point of a predetermined position, and may be a point extracted by a predetermined algorithm that extracts a predetermined point. On the assumption that a distance from the image device 8 to a point in a real space that corresponds to the specific point is known, the movement calculation unit 114 can derive a change in relative positional relationship between the image device 8 and the specific point in the real space from the distance, the motion vector of the specific point, a size of the captured image, and an angle of view (that can be identified from setting of the image device 8) of the captured image. In other words, the movement calculation unit 114 can derive the amount of movement of the flying object 1a. As one example, the movement calculation unit 114 may derive the amount of movement $D_M$ in a horizontal direction of the position of the flying object 1a from $D_M = 2L \times \tan(\psi/2) \times vp/d$ by using a distance L to a point in a real space that corresponds to a specific point, a length d in the horizontal direction of the captured image, an angle of view $\psi$ in the horizontal direction of the captured image, and a motion vector vp of the specific point. The amount of movement in a vertical direction can also be derived similarly. Note that, the movement calculation unit 114 may use a statistical value (an average value, a mode, a median value, or the like) of a value acquired for each of a plurality of specific points as a value (such as vp and L) used for deriving the amount of movement of the flying object 1a.

Note that, the distance from the image device 8 to a point in a real space that corresponds to the specific point may be a value acquired by a sensor capable of measuring a distance to an object, such as a distance sensor, and may be a value being provisionally set. An operation of the data processing device 11 when the distance from the image device 8 to a point in a real space that corresponds to the specific point is not known or when the distance is provisionally set may be referred to description of a modification example <7> and a second example embodiment, which are described later.

The movement calculation unit 114 derives a speed in a period between two or more points in time after deriving the amount of movement of the flying object 1a. Then, the movement calculation unit 114 estimates acceleration in the periods between the two or more points based on the variation amount of speed at the two or more different points in time.

The movement calculation unit 114 writes a value of the acceleration of the flying object 1a acquired by the estimation to the data storage unit 119.

The resultant calculation unit 115 calculates a force the flying object 1a receives based on the acceleration acquired by the movement calculation unit 114. The force the flying object 1a receives is a force (resultant) acquired by combining the propulsive force, the external force, and gravity.

A method of calculating the resultant from acceleration may be a method based on a calculation model indicating a relationship between acceleration and the resultant. The calculation model indicating the relationship between acceleration and the resultant is, for example, the Newton's laws of motion.

The resultant calculation unit 115 writes a value of the resultant identified by the calculation to the data storage unit 119.

The external force estimation unit 116 estimates the external force received by the flying object 1a based on the resultant calculated by the resultant calculation unit 115, the propulsive force identified by the propulsive force identification unit 112, and the attitude identified by the attitude identification unit 113. The external force in the present example embodiment is a force received from wind.

The external force estimation unit 116 estimates the external force by calculating a difference between the resultant calculated by the resultant calculation unit 115 and the propulsive force.

The external force estimation unit 116 records a value of the estimated external force in the data storage unit 119.

The relationship estimation unit 117 estimates a relationship between strength of the wind and magnitude of the estimated external force from the wind information acquired by the wind information acquisition unit 111 and the external force estimated by the external force estimation unit 116. A specific example of a method will be described in detail in description of an example of processing in Step S18 described later.

<Operation>

A flow of an operation of the flying object 1a according to the present example embodiment will be described with reference to a flowchart in FIG. 4.

First, it is assumed that the flying object 1a is flying. The flying object 1a may be horizontal or tilted. The wind sensor 5 measures wind strength the wind sensor 5 receives during flying.

Figure 4:
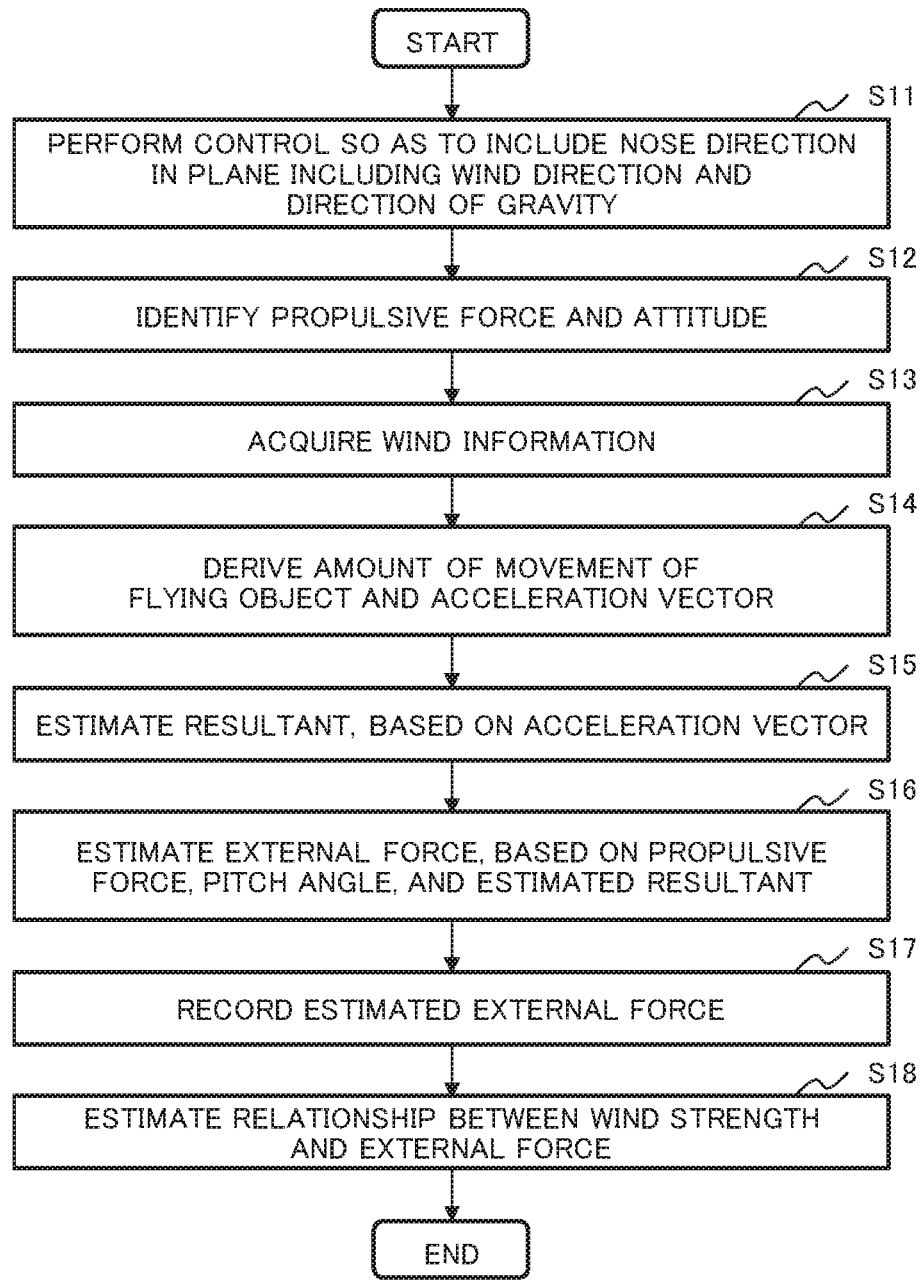
FIG. 4 is a flowchart illustrating a flow of an operation of the flying object according to the first example embodiment.

As one example, when a measurement value acquired by the wind sensor 5 is equal to or greater than a threshold value, processing illustrated in the flowchart in FIG. 4 starts. For example, the measurement condition control unit 110 may receive the measurement value from the wind sensor 5, and determine whether the measurement value is equal to or greater than the threshold value. When the plurality of wind sensors 5 are present, the measurement condition control unit 110 may determine whether any of a plurality of measurement values is equal to or greater than a threshold value. Note that, the threshold value is a value being preset by a designer and the like. As the threshold value, for example, a minimum value of a value conceivable to have a significant influence on a position of the flying object $1a$ is set.

When a measurement value is equal to or greater than the threshold value, the measurement condition control unit 110 performs processing in Step S11. In Step S11, the measurement condition control unit 110 performs control in such a way as to include the nose direction in a plane including the wind direction and the direction of gravity.

Specifically, when the direction of the wind is identified, the measurement condition control unit 110 may instruct, to the control signal generation unit 211 of the drive control device 21, a rotational angle about the $^b$z axis in such a way that a horizontal component of the nose direction coincides with a horizontal component of the direction of the wind.

When the direction of the wind is not identified, the measurement condition control unit 110 may control in such a way that a direction of the flying object $1a$ is a direction in which a measurement value of the wind sensor 5 whose measurement direction coincides with the nose direction is maximum.

More specifically, the measurement condition control unit 110, first, instructs the drive control device 21 to rotate the flying object $1a$ about the $^b$z axis or a gravitational direction by using a function of controlling the attitude. Next, the measurement condition control unit 110 observes the measurement value by the wind sensor 5 whose measurement direction is the nose direction during the rotation of the flying object $1a$. Then, the measurement condition control unit 110 identifies the direction of the flying object $1a$ in which the measurement value is maximum.

Then, the measurement condition control unit 110 instructs the drive control device 21 to set the direction of the flying object $1a$ to the identified direction. The instruction may include, for example, a numerical value indicating magnitude of a rotational angle about the $^b$z axis. In this way, the drive control device 21 controls the rotation of the rotor blade 2 by the actuator 9, and rotates the flying object $1a$ about the $^b$z axis by the angle indicated in the instruction. As a result, the horizontal direction component of the nose direction is opposed to the horizontal direction component of the direction of the wind. Further, hereinafter, a direction of the propulsive force is included in the plane including the direction of the wind and the direction of gravity regardless of a pitch angle.

In Step S12, the propulsive force identification unit 112 and the attitude identification unit 113 identify the propulsive force and the attitude of the flying object $1a$.

The drive control device 21 may change the propulsive force and the pitch angle (namely, an angle at which the nose is lowered) between Step S11 and Step S12. In processing until at least Step S14 in and after Step S12, it is assumed that the propulsive force and the attitude of the flying object $1a$ are maintained.

In Step S13, the wind information acquisition unit 111 acquires the wind information. A method of acquiring the wind information will be described later.

In Step S14, the movement calculation unit 114 derives the amount of movement of the flying object $1a$ and an acceleration vector based on the captured image acquired by the image device 8.

An order of the processing from Step S12 to Step S14 may be different from the above-described order.

In Step S15, the resultant calculation unit 115 calculates the resultant applied to the flying object $1a$ based on the acceleration vector.

In Step S16, the external force estimation unit 116 estimates the external force based on the propulsive force, the pitch angle, and the acceleration vector. Further, the external force estimation unit 116 records the estimated external force in the data storage unit 119 (Step S17).

Then, the relationship estimation unit 117 estimates a relationship between strength of the wind and the external force from the wind information and the estimated external force (Step S18).

Hereinafter, a specific example of a computation in each processing is indicated. However, as also described in a modification example <6> described later, the computation introduced below is merely one example. Various equations, calculation models, and the like used for deriving each estimated value may be designed as long as they do not violate an object of data processing.

Hereinafter, a vertically downward direction is defined as a z direction, the $^b$y axis direction is defined as a y direction, and the nose direction ($^b$x axis direction) when the flying object $1a$ is not tilted is defined as an x direction.

Note that, the direction of the propulsive force of the flying object $1a$ is inevitably a direction included in an xz plane according to the definition described above. Further, since a direction of the flying object $1a$ is controlled in such a way that the horizontal direction component of the nose direction is opposed to the horizontal direction component of the direction of the wind by the processing in Step S11, the direction of the wind is a direction included in the xz plane. Therefore, a direction in which the flying object $1a$ moves by the propulsive force, the external force and gravity is also a direction included in the xz plane.

Figure 5:
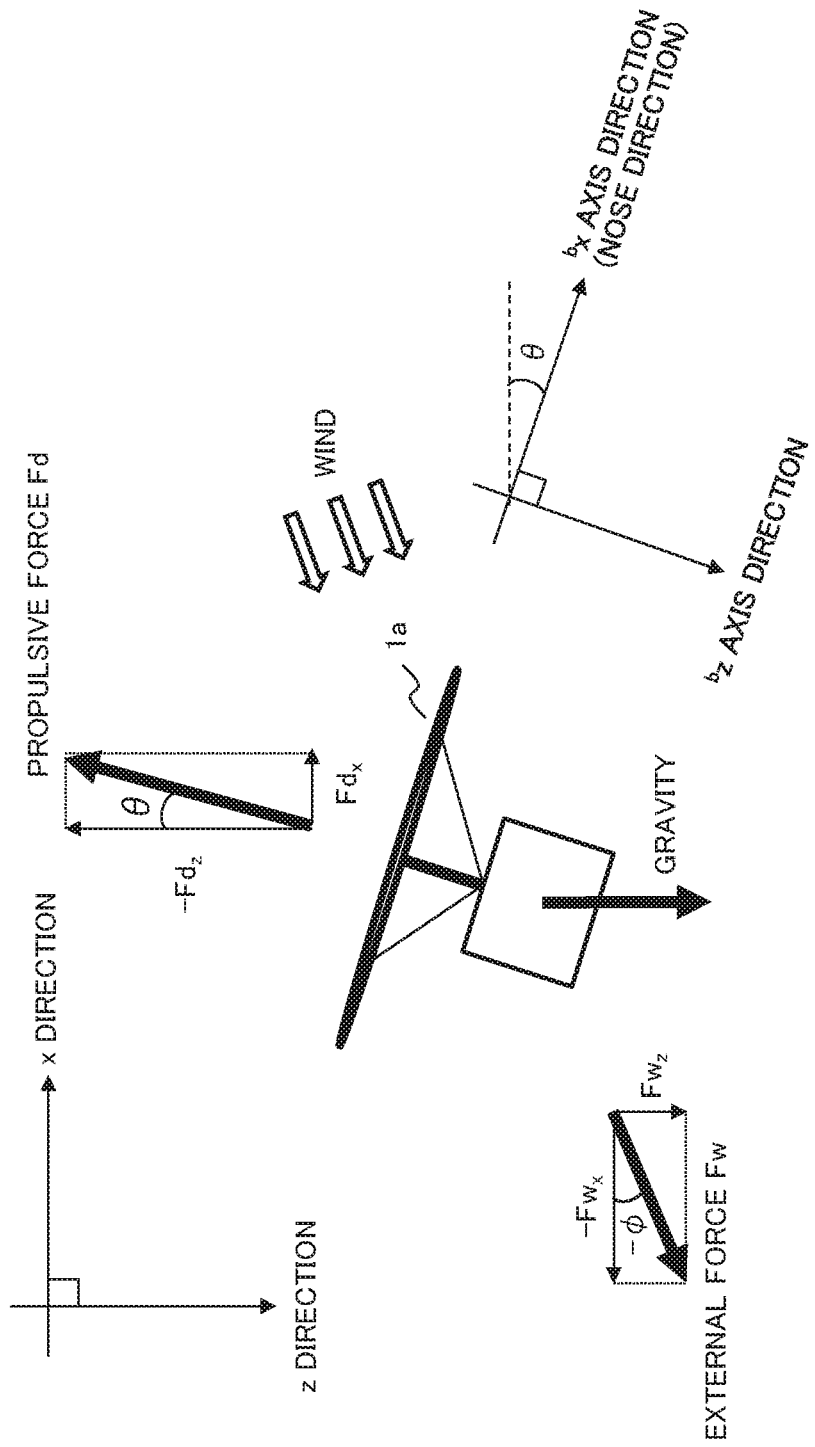
FIG. 5 is a schematic diagram illustrating the flying object when viewed from a $^b$y axis direction and a force applied to the flying object.

As a reference, FIG. 5 is a schematic diagram illustrating the flying object $1a$ when viewed from the $^b$y axis direction and a force applied to the flying object $1a$. In the following description, all the force applied to the flying object $1a$ is described by unifying positive and negative directions.

[Step S13]

In Step S13, the wind information acquisition unit 111 identifies the direction and strength of the wind by using measurement values measured at two points in time at which the $^b$y axis is different by the wind sensor 5 whose measurement direction coincides with the nose direction, for example.

For example, the wind information acquisition unit 111 acquires a measurement value (x direction component of wind speed) $W_1$ when the flying object $1a$ is horizontal and a measurement value ($^b$x axis direction component of wind speed) $W_2$ when the pitch angle is θ. The measurement value $W_1$ may be measured at a point in time before Step S12. The measurement value $W_2$ may be measured after Step S12.

Figure 6:
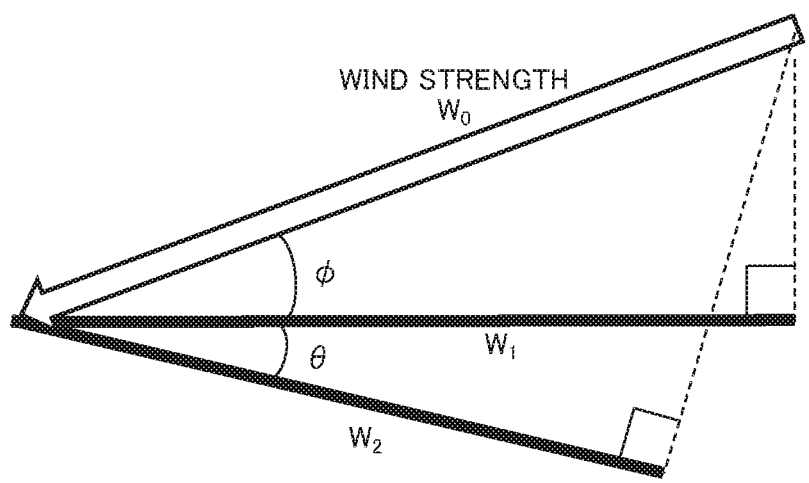
FIG. 6 is a schematic diagram illustrating a relationship between a direction and wind strength and two measurement values.

For strength $W_0$ of the wind and an elevation angle φ of the wind, since $W_0 \times \cos φ = W_1$, $W_0 \times \cos(θ+φ) = W_2$ theoretically holds true (see FIG. 6), by solving this as simultaneous equations, it can be said that $φ = \text{Arctan}\{(W_2 - W_1 \times \cos θ)/(-W_1 \times \sin θ)\}$, and $W_0 = W_1/\cos φ = W_2/\cos(θ+φ)$. Note that, these equations also hold true when a value of φ is negative.

The wind information acquisition unit 111 may derive the strength $W_0$ of the wind and the elevation angle φ of the wind from the measurement value $W_1$ in the horizontal direction and the measurement value $W_2$ when the pitch angle is θ by using the equation described above. Note that, needless to say, the wind information acquisition unit 111 can also derive the strength $W_0$ of the wind and the elevation angle φ of the wind in a similar manner by using measurement values $W_3$ and $W_4$ in two directions that are not horizontal.

The wind information acquisition unit 111 records the derived direction and strength of the wind as the wind information in the data storage unit 119.

[Step S14]

In Step S14, the movement calculation unit 114 calculates an optical flow for the captured image acquired at each of two or more different points in time, for example, and derives the speed of the flying object 1a based on the calculated optical flow. A speed vector in a direction perpendicular to the image capturing direction of the image device 8 can be derived based on the optical flow. In the present example embodiment, the image capturing direction of the image device 8 is the $^b$y axis direction, and thus the derived speed vector is a vector on a plane including the x direction and the z direction. In other words, the derived speed vector can be described by two components of an x direction component and a z direction component. Note that, the image device 8 is also tilted when the flying object 1a is tilted. Thus, when the speed vector is described by the two components of the x direction component and the z direction component, the movement calculation unit 114 identifies the x direction and the z direction based on the pitch angle of the flying object 1a identified by the attitude identification unit 113.

Acceleration can be derived based on a change in speed at certain two points in time. For example, it is assumed that the movement calculation unit 114 derives a vector V1 as the speed vector at a first point in time, and derives a vector V2 as a speed vector at a second point in time after t seconds since the first point in time. In this case, the movement calculation unit 114 derives (V2−V1)/t as an acceleration vector.

The derived acceleration vector can be described by the two components of the x direction component and the z direction component, similarly to the speed vector.

[Step S15]

In Step S15, the resultant calculation unit 115 estimates the x direction component and the z direction component of a force the flying object 1a received from an equation based on the laws of motion, for example. When it is assumed that acceleration of the flying object 1a is "a" and a mass of the flying object 1a is "M", the force "F" the flying object 1a received is calculated by F=M×a by the laws of motion. When it is assumed that the x direction component of the force the flying object 1a received is "$F_x$" and acceleration in the x direction is "$a_x$", $F_x$=M×$a_x$ holds true. When it is assumed that the z direction component of the force the flying object 1a received is "$F_z$" and acceleration in the z direction is "$a_z$", $F_z$=M×$a_z$ holds true.

It is assumed that the mass ("M") of the flying object 1a is known in the description of the present example embodiment. Therefore, the resultant calculation unit 115 can estimate values of the forces "$F_x$" and "$F_z$" the flying object 1a received based on "M", "$a_x$", and "$a_z$". Note that, an example embodiment when "M" is not known will be described in description of the modification example <6>.

The resultant calculation unit 115 may treat a group of "$F_x$" and "$F_z$" as a "resultant vector". When the acceleration of the flying object 1a is exerted by the acceleration vector (a group of "$a_x$" and "$a_z$"), the resultant calculation unit 115 may derive the resultant vector by calculating a product of the acceleration vector and "M".

[Step S16]

In Step S16, the external force estimation unit 116 estimates the x direction component and the z direction component of the external force, for example.

To derive the external force, the external force estimation unit 116 calculates the x direction component and the z direction component of the propulsive force from the propulsive force and the pitch angle. For example, it is assumed that the propulsive force identified by the propulsive force identification unit 112 is Fd, and the pitch angle identified by the attitude identification unit 113 is θ. As illustrated in FIG. 5, since the propulsive force Fd is tilted from the vertical direction by the pitch angle θ, $Fd_x$=Fd×sin θ and $Fd_z$=−Fd×cos θ hold true when it is assumed that the x direction component of the propulsive force Fd is "$Fd_x$" and the z direction component of the propulsive force Fd is "$Fd_z$". The external force estimation unit 116 may identify the x direction component and the z direction component of the propulsive force by the equations above.

Further, the external force estimation unit 116 calculates gravity the flying object 1a receives. When it is assumed that a mass of the flying object 1a is "M" and gravitational acceleration is "g", magnitude of gravity the flying object 1a receives is "M×g".

The external force estimation unit 116 calculates the external force by using the value identified as described above. Specifically, when it is assumed that the x direction component of the external force is "$Fw_x$" and the z direction component of the external force is "$Fw_z$", the external force estimation unit 116 calculates the values of "$Fw_x$" and "$Fw_z$" from $Fw_x$=$F_x$−$Fd_x$ and $Fw_z$=$F_z$−$Fd_z$−M×g.

The calculation described above is synonymous with acquiring a vector (a group of "$Fw_x$" and "$Fw_z$") of the external force by subtracting a vector of the propulsive force and a vector of the gravity from the resultant vector.

The external force estimation unit 116 records the calculated values of "$Fw_x$" and "$Fw_z$" as the estimated external force in the data storage unit 119.

An example of a table generated based on the processing from Step S12 to Step S17 is illustrated in FIG. 7. In this table, the x direction component $W_x$ and the z direction component $W_z$ of the wind speed are recorded as the wind information. This table is one of pieces of information (hereinafter also referred to as "relationship information") indicating a relationship between wind strength the flying object 1a received and the estimated external force. It can also be said that a group (data set) of the estimated external force and the wind information indicated by one row in this table is the relationship information.

[Step S18]

In Step S18, the relationship estimation unit 117 derives a value indicating a relationship between strength of the wind and the external force, for example.

For example, based on a standpoint of hydromechanics in which magnitude of a force exerted on an object by wind at the wind speed of V is proportional to a square of V, a calculation model of |Fw|=α$V^2$ may be adopted as a calculation model indicating a relationship between magnitude |Fw| of the estimated external force and V. α is a coefficient depending on a shape and an area of an object that receives wind, viscosity and density of the wind, and the like. A value of α can be derived based on this calculation model when values of |Fw| and V are known.

The relationship estimation unit 117 may derive the value of α described above based on the estimated external force and the measured wind speed. Specifically, the relationship estimation unit 117 may acquire a group of the magnitude |Fw| of the estimated external force and the wind speed at a certain point in time stored in the data storage unit 119, and derive a value acquired by dividing |Fw| by a square of the wind speed as the value of α described above.

A specific example of a calculation of a value of a will be described with reference to the example in FIG. 7. The relationship estimation unit 117 acquires the estimated external force and the wind speed at a time 0:00:00 from the table illustrated in FIG. 7, for example. The x direction component $Fw_x$ of the estimated external force is −1.345, a z direction component $Fw_z$ is +0.156, the x direction component $W_x$ of the wind speed is −7.22, and the z direction component $W_z$ is +0.94. Thus, the relationship estimation unit 117 may calculate the value of a as follows.

$$\alpha = |Fw|/V^2 = \sqrt{(-1.345)^2 + 0.156^2} / \{(-7.22)^2 + 0.94^2\} = 0.0255 \quad \text{[Equation 1]}$$

The relationship estimation unit 117 may derive a plurality of values of a by using two or more data sets. When a calculation similar to the calculation described above is performed on a data set at a time 0:00:10 in the table illustrated in FIG. 7, "0.0241" is derived as a second value of α.

When deriving a plurality of values of α, the relationship estimation unit 117 may derive a representative value of the plurality of values of α. The representative value is, for example, one value of the plurality of values of α, or an average value, a mode, or a median value of the plurality of values of α, or the like.

Accuracy of a value of a is expected to be higher as the value is derived from the data set at a point in time at which acceleration of the flying object 1a is smaller. A reason for this is that, as acceleration is smaller, a speed change of a flying object is smaller, and a change in strength (relative strength) of a measured wind also becomes smaller. Based on this, the relationship estimation unit 117 may determine a value of a associated with the smallest acceleration among acquired acceleration as the representative value of α.

<Effect>

The flying object 1a according to the first example embodiment can acquire information indicating a relationship between wind strength received by the flying object 1a and the external force. As a specific example, the data processing device 11 can acquire the data set of wind strength received by the flying object 1a and the external force, and the coefficient α.

By determining a value of the coefficient α, it becomes clear that how much force of the wind the flying object 1a received is actually exerted on the flying object 1a. For example, it is assumed that the value of the coefficient α is derived as 0.0241. When the flying object 1a receives wind at a wind speed 9 m/s, it is clear that magnitude of the external force the flying object 1a received is 0.0241× $9^2$=1.952 N based on the equation $|Fw|=\alpha V^2$.

When the magnitude of the external force received by the flying object 1a is known, the propulsive force and the attitude for canceling an influence of the wind can be identified. For example, in the above-described example, the propulsive force and the attitude may be controlled in such a way that the propulsive force of the flying object 1a is increased by 1.952 N in a direction opposed to a direction of the wind in order to cancel the influence of the wind. In this way, the flying object 1a can perceive the influence of the wind, and the propulsive force and the attitude for canceling the influence of the wind based on the information indicating the relationship between the strength of the wind and the external force.

Further, since the information acquired by the data processing device 11 is derived based on the relationship between wind strength being actually measured and acquired acceleration, the information is expected to be more accurate than information being previously prepared based on a theory.

As described above, according to the present example embodiment, the influence of wind on the moving body (flying object 1a) can be accurately perceived from information acquired from the moving body.

Modification Example

Modification examples of the example embodiment described above will be described.

<1>

Data stored in the data storage unit 119 may be information with which a value that needs to be held can be identified. For example, the external force estimation unit 116 may write, to the table, a value acquired by dividing the external force by the mass M instead of the external force as information with which the external force can be identified.

<2>

The nose direction can be changed at any time. In other words, the drive control device 21 can tilt the flying object 1a to any direction. The tilted direction may be defined as the nose direction.

<3>

The image capturing direction of the image device 8 may be configured not to depend on the direction of the flying object 1a.

For example, by installing the plurality of image devices 8 in such a way as to be directed in different directions about the $^b z$ axis, any of the image devices 8 may be able to acquire a captured image with which the amount of movement of the flying object 1a and acceleration can be estimated even when a nose direction of the flying object 1a is any direction. Alternatively, for example, the image device 8 may be an omnidirectional camera capable of capturing all directions perpendicular to the $^b z$ axis at once.

Alternatively, the image device 8 may be installed in such a way that the image capturing direction is variable. For example, the image capturing direction of the image device 8 may be rotatable about the $^b z$ axis, and may be controllable by a control unit (such as the measurement condition control unit 110) that controls the image capturing direction.

<4>

When the nose direction can be changed at any time and the image capturing direction of the image device 8 does not depend on the direction of the flying object 1a, the processing in Step S11 can be omitted. When the image capturing direction is variable, processing in Step S21 in which the measurement condition control unit 110 performs control in such a way that the image capturing direction of the image device 8 is perpendicular to a wind direction may be used instead of the processing in Step S11. By such processing, the image device 8 can acquire the captured image with which the amount of movement of the flying object 1a and acceleration can be estimated without rotating the flying object 1a.

<5>

When the plurality of wind sensors 5 are present and the nose direction is variable, the measurement condition control unit 110 may perform control in such a way as to include the measurement direction of any of the wind sensors 5 in a plane including the wind direction and the direction of gravity in the processing in Step S11. When a plurality of (k) wind sensors 5 are present, the measurement condition control unit 110 can suppress a rotation amount of the flying object 1a by performing control in such a way as to include the measurement direction of the wind sensor 5 indicating the highest value among measurement values of the respective wind sensors 5 in a plane including the wind direction and the direction of gravity. For example, when the plurality of (k) wind sensors 5 are disposed in such a way as to have k-fold rotational symmetry about the $^b$z axis of the flying object 1a, a range of an angle at which the flying object 1a is rotated in the processing in Step S11 can be within 360°/k.

Note that, even when control is performed in such a way as to include the measurement direction of any of the wind sensors 5 in a plane including the wind direction and the direction of gravity, the image device 8 may be configured to be able to acquire the captured image with which the amount of movement of the flying object 1a and acceleration can be estimated.

<6>

A value derived by the data processing device 11 may be derived based on a formula different from the formula described above.

For example, when there is an equation indicating a relationship between wind strength and the measurement value better than the equation of $W_0 \times \cos\varphi = W_1$ and $W_0 \times \cos(\theta+\varphi) = W_2$ described above, the wind information acquisition unit 111 may derive $W_0$ and $\varphi$ based on the equation.

An equation is used by the relationship estimation unit 117 may be, for example, $\alpha = |Fw|/V$ instead of $\alpha = |Fw|/V^2$.

Alternatively, an equation is used by the relationship estimation unit 117 may be an equation similar to $\alpha = |Fw| \times P(\theta+\varphi)/V^2$ using a function $P(\theta+\varphi)$ that changes according to a relative direction (angle of $\theta+\varphi$) of wind with respect to the flying object 1a while taking into consideration a change in strength of a force due to a difference of the relative direction of the wind.

In addition to the formula described above, a person skilled in the art may freely design a formula related to estimation of a value of an estimated object for more accurately estimating the value of the estimated object.

<7>

An object having a value to be estimated by the relationship estimation unit 117, such as a, may not be one. The relationship estimation unit 117 can derive a plurality of values of a parameter whose value is unknown by using a plurality of data sets of the estimated external force and the measurement value.

As an example, the relationship estimation unit 117 may set values of $C_1$, $C_2$, $C_3$, and $C_4$ as objects to be estimated with a relationship between $Fw_x$, $Fw_z$, $W_x$, and $W_z$ as $$Fw_x = C_1 \times f(W_x) + C_2 \times g(W_z), \text{ and}$$

$$Fw_z = C_3 \times f(W_x) + C_4 \times g(W_z).$$

However, a function f and a function g are predefined functions. In this case, objects to be estimated (hereinafter also referred to as "estimated objects") are four of $C_1$, $C_2$, $C_3$, and $C_4$, and thus the relationship estimation unit 117 can estimate values of $C_1$, $C_2$, $C_3$, and $C_4$ that match four or more data sets by using the data sets. Examples of a method of estimating a value include a least squares method. Note that, an unknown parameter may be further set among the function f and the function g as a modification example of the example described above.

It is assumed as another example that the mass M is unknown. In this case, based on $Fw_x = M \times a_x - Fd_x$, $Fw_z = M \times a_z - Fd_z - M \times g$, and the equation of $|Fw| = \alpha V^2$, $$\sqrt{(M \times a_x - Fd_x)^2 + (M \times a_z - Fd_z - M \times g)^2} = \alpha + (w_x^2 + w_z^2) \quad \text{[Equation 2]}$$

is acquired as an equation. In the equation, when it is assumed that two of M and a are estimated objects, values of M and a can be estimated by acquiring two or more data sets of $a_x$, $a_z$, $Fd_x$, $Fd_z$, $W_x$, and $W_z$.

Similarly, the data processing device 11 may set a plurality of estimated objects in various calculations related to estimation of the external force and the measurement value, and estimate a value of the estimated object from a plurality of data sets.

Second Example Embodiment

Figure 8:
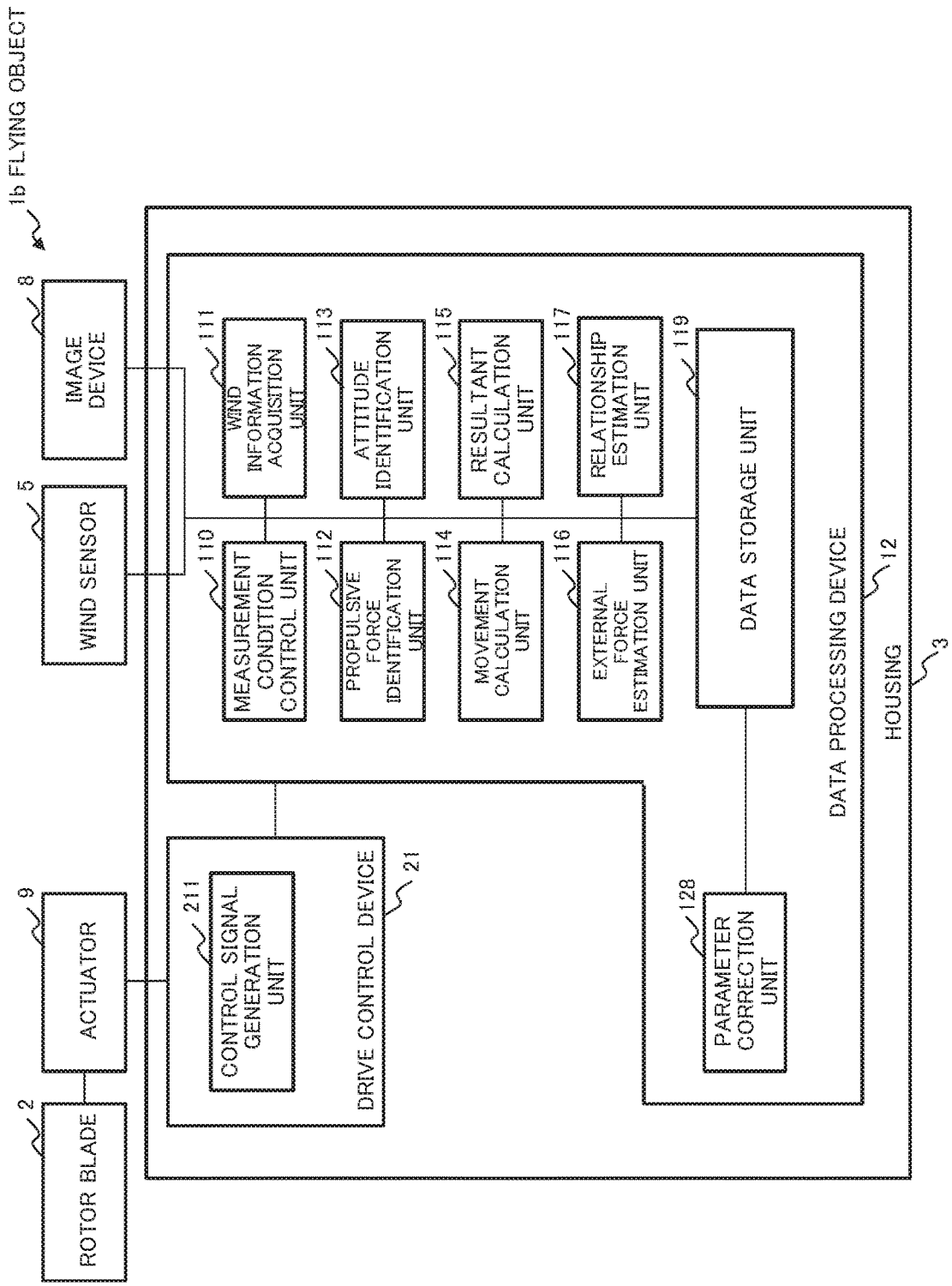
FIG. 8 is a block diagram illustrating a configuration of a flying object according to a second example embodiment of the present invention.

A flying object 1b according to a second example embodiment will be described. FIG. 8 is a block diagram illustrating a configuration of the flying object 1b. The flying object 1b includes a parameter correction unit 128 as a component of a data processing device 12 in addition to the components included in the data processing device 11. A component other than the parameter correction unit 128 is similar to the component of the flying object 1a.

The parameter correction unit 128 corrects at least one parameter used in calculation for deriving a value derived by at least any of a wind information acquisition unit 111 and an external force estimation unit 116 based on relationship information.

The parameter correction unit 128 may correct the parameter at an opportunity of the following cases, for example.

A case where variations in an estimated value of the estimated object, such as α, do not satisfy a reference (a case where a difference between a maximum value and a minimum value of estimated values of estimated objects in the latest several data sets, a case where variance of estimated values of estimated objects in the latest several data sets is equal to or greater than a predetermined value, or the like)

A case where a disparity between the wind direction and the direction of the external force does not satisfy a reference (a case where the data set in which an angle formed by the wind direction and the direction of the external force is equal to or greater than a predetermined angle is present, a case where an average of angles formed by the wind direction and the direction of the external force in the latest several data sets is equal to or greater than a predetermined angle, or the like)

The parameter as an object to be corrected may be set arbitrarily. For example, The mass M, The coefficient K indicating a relationship between the control signal and the propulsive force, a constant used in a correction function $P(\theta+\varphi)$ according to the wind direction with respect to the flying object 1b, a constant (such as L) used in calculation of the optical flow, and the like may be an object to be corrected. Note that, the object to be corrected may be defined at a time of designing the data processing device 12. Note that, the value of the parameter is stored in the data storage unit 119, for example.

The parameter correction unit 128 derives an optimum value of a parameter of a corrected object based on a plurality of data sets. Specifically, for example, the parameter correction unit 128 identifies the value of the parameter of the corrected object in such a way as to minimize variations in value of an estimated object in the latest several data sets. Alternatively, for example, the parameter correction unit 128 may identify the value of the parameter of the corrected object in such a way as to minimize an angle formed by the direction of the estimated external force and the wind direction in the latest several data sets. The parameter correction unit 128 may identify the value of the parameter of the corrected object by using the least squares method, for example. Then, the parameter correction unit 128 rewrites the value of the parameter of the corrected object stored in the data storage unit 119 with the identified value.

A plurality of parameters of corrected objects may be used. Even when the plurality of parameters of corrected objects are used, an optimum value of each of the parameters can be derived by using many data sets.

Such a configuration improves accuracy of a value indicating a relationship between wind strength and the external force being estimated by a relationship estimation unit 117. A reason for the improvement of the accuracy is that the external force is estimated based on the value of the estimated object based on the value of the corrected parameter.

Third Example Embodiment

An example embodiment in which a component is further added to the flying object 1b in the second example embodiment will be described as a third example embodiment.

Figure 9:
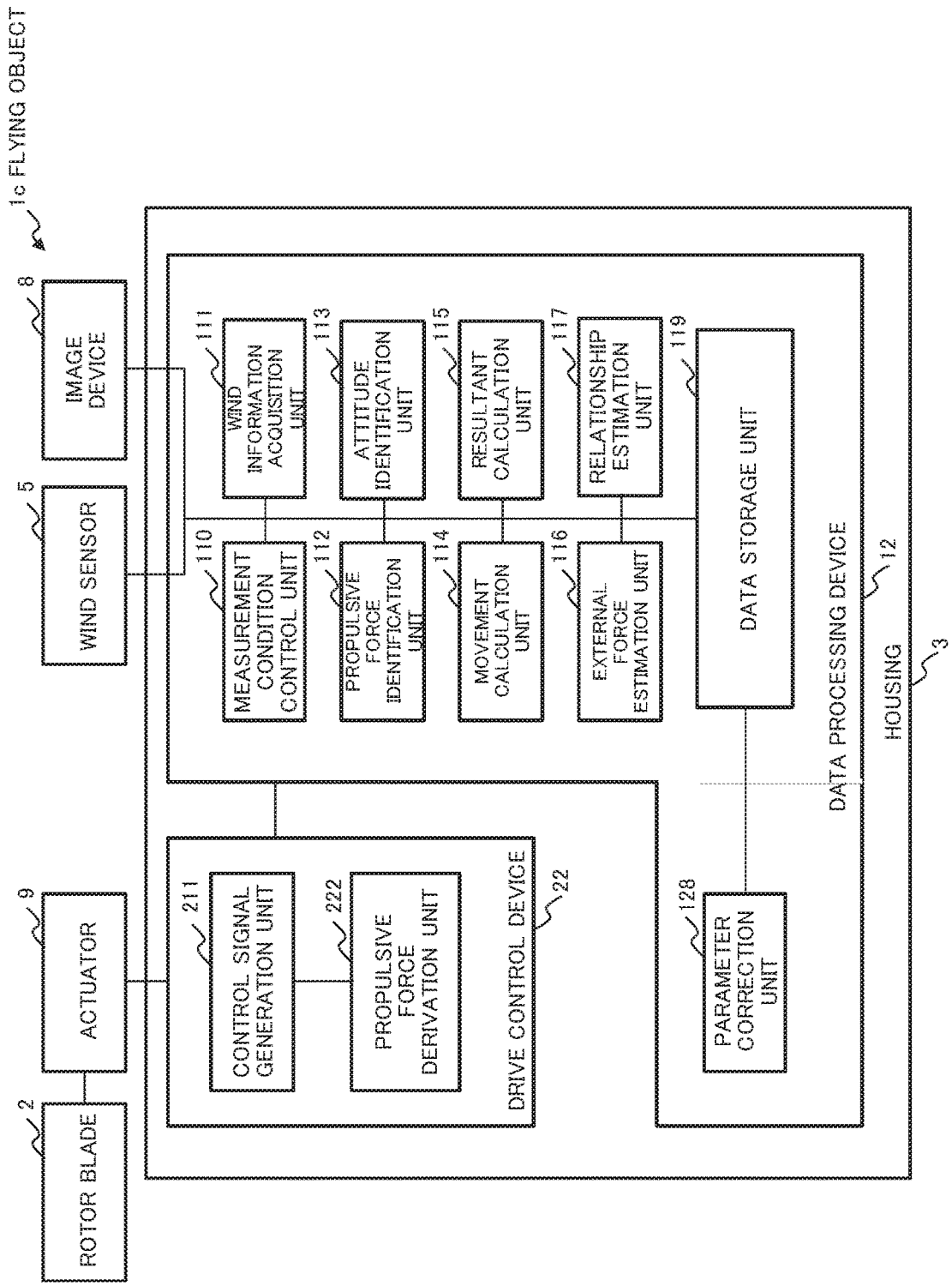
FIG. 9 is a block diagram illustrating a configuration of a flying object according to a third example embodiment of the present invention.

FIG. 9 is a block diagram illustrating a configuration of a flying object 1c according to the third example embodiment. A drive control device 22 of the flying object 1c includes a propulsive vector derivation unit 222. A component other than the propulsive vector derivation unit 222 is similar to the component of the flying object 1b.

The propulsive vector derivation unit 222 derives a propulsive vector with a consideration given to an influence of wind the flying object 1c receives. The propulsive vector is a vector indicating magnitude and the direction of the propulsive force.

For example, the propulsive vector derivation unit 222 derives the propulsive vector that reduces an influence of wind the flying object 1c received on acceleration of the flying object 1c. Specifically, the propulsive vector derivation unit 222 acquires the wind information about the wind the flying object 1c receives and relationship information acquired by the relationship estimation unit 117 from the data processing device 12. Then, the propulsive vector derivation unit 222 derives magnitude and the direction of the external force exerted on the flying object 1c by the wind based on the acquired wind information and the acquired relationship information. Then, the propulsive vector derivation unit 222 derives the propulsive vector that reduces acceleration by the external force. More specifically, for example, the propulsive vector derivation unit 222 may derive, as the propulsive vector, a propulsive vector that cancels out the derived external force, namely, a force having the same magnitude as the external force in a direction opposite to the direction of the external force.

When acceleration being a target of the flying object 1c is not "0", the propulsive vector derivation unit 222 may further derive the propulsive vector acquired by adding the propulsive vector that achieves the acceleration being the target to a propulsive vector that cancels out the derived external force.

The propulsive vector derivation unit 222 sends a control instruction to the control signal generation unit 211 to generate the derived propulsive vector to the flying object 1c. The propulsive vector derivation unit 222 includes, in the control instruction, information about a target propulsive force and a target attitude in such a way as to set a propulsive vector of the flying object 1c to the derived propulsive vector, for example.

The control signal generation unit 211 sends the control signal to an actuator 9 based on the control instruction from the propulsive vector derivation unit 222, and controls the propulsive force and the attitude of the flying object 1c.

Figure 10:
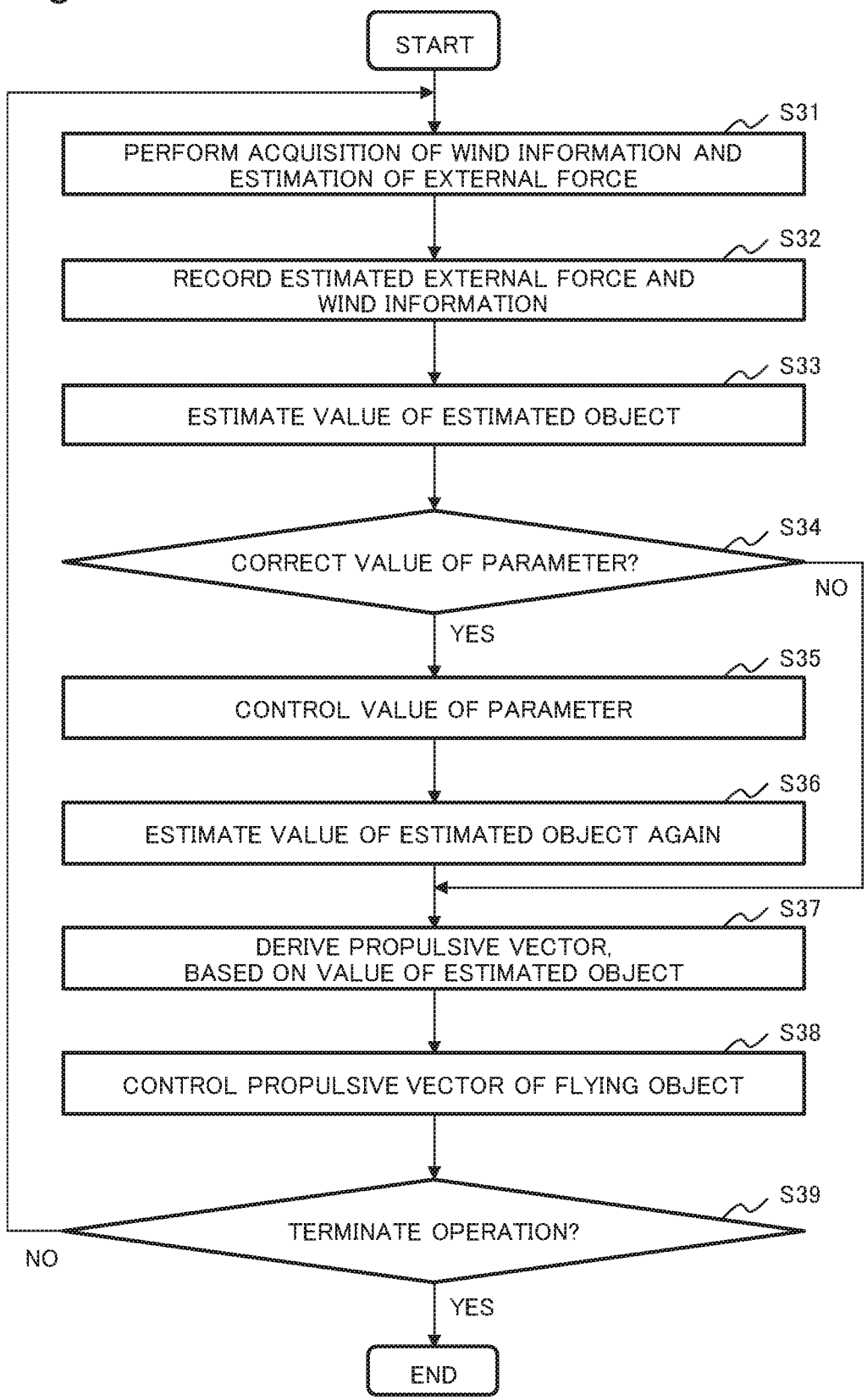
FIG. 10 is a flowchart illustrating a flow of an operation of the flying object according to the third example embodiment.

An example of a flow of an operation of the flying object 1c will be described with reference to a flowchart in FIG. 10.

The flying object 1c repeats processing from Step S31 to Step S38 until determination of terminating the operation is made (YES in Step S39). The determination in Step S39 may be made by, for example, the measurement condition control unit 110. In Step S39, the measurement condition control unit 110 may determine termination of the operation with a lapse of a certain period of time as a basis, or may determine termination of the operation with reception of an operation termination instruction from the outside as a basis.

In Step S31, the data processing device 12 of the flying object 1c performs acquisition of the wind information and estimation of the external force by performing processing similar to the processing from Step S11 to Step S16 in the flowchart in FIG. 4.

In Step S32, the data processing device 12 records the value of the estimated external force and the wind information.

In Step S33, the relationship estimation unit 117 of the data processing device 12 estimates the value of the estimated object.

In Step S34, the parameter correction unit 128 determines whether to correct the value of the parameter. As an example, when a predetermined number or greater of data sets of the estimated external force and the wind information is recorded and a value of the estimated object being most recently estimated exceeds the threshold value, the parameter correction unit 128 determines that the parameter is to be corrected. When it is determined that the parameter is to be corrected (YES in Step S34), the parameter correction unit 128 corrects the parameter in Step S35. Furthermore, in Step S36, the relationship estimation unit 117 estimates the value of the estimated object again based on the corrected parameter. When it is determined that the parameter is not to be corrected (NO in Step S34), the data processing device 12 performs processing in Step S37 without performing the processing in Steps S35 and S36.

In Step S37, the propulsive vector derivation unit 222 derives the propulsive vector based on the wind information about wind the flying object 1c receives and the value of the estimated object.

In Step S38, the control signal generation unit 211 performs control in such a way as to set the propulsive vector of the flying object 1c to the derived propulsive vector.

According to the configuration and the operation as described above, in the flying object 1c, the propulsive vector that reduces magnitude of acceleration exerted on the flying object 1c by the wind is derived more accurately each time the processing in Step S37 is performed. Therefore, even when there is wind, acceleration and the position of the flying object 1c can be controlled as intended. Since a relationship between wind strength and the external force is acquired, a minute adjustment to the acceleration and the position can be made even when the strength of the wind changes.

For example, when the propulsive vector derivation unit 222 derives the propulsive vector that cancels out magnitude of acceleration exerted on the flying object 1c by wind as the propulsive vector of the flying object 1c, the acceleration of the flying object 1c is expected to approach "0" by repeating derivation of the value of the estimated object and the derivation of the propulsive vector.

Herein, when acceleration is great, a change in relative speed of wind with respect to the flying object 1c is great, and thus the measurement value by a wind sensor 5 also changes. Accordingly, accuracy of the wind information and accuracy of the value of the estimated object being estimated based on the wind information may not be sufficient. On the contrary, the value of the estimated object being estimated based on the data set when acceleration of the flying object 1c is close to "0" is expected to be more accurate. Therefore, when the propulsive vector derivation unit 222 derives the propulsive vector that cancels out magnitude of acceleration exerted on the flying object 1c by wind as the propulsive vector of the flying object 1c, there is an effect of improving accuracy of the value of the estimated object being estimated.

Further, the propulsive vector derivation unit 222 may derive the propulsive vector by using the value of the estimated object being estimated based on the data set when magnitude of acceleration of the flying object 1c is the smallest. In this way, the drive control device 22 can make a more minute adjustment to acceleration and a position.

Fourth Example Embodiment

A fourth example embodiment according to the present invention will be described. The fourth example embodiment is an example embodiment in which a data processing device 10 processes data related to a moving body 1.

Figure 11:
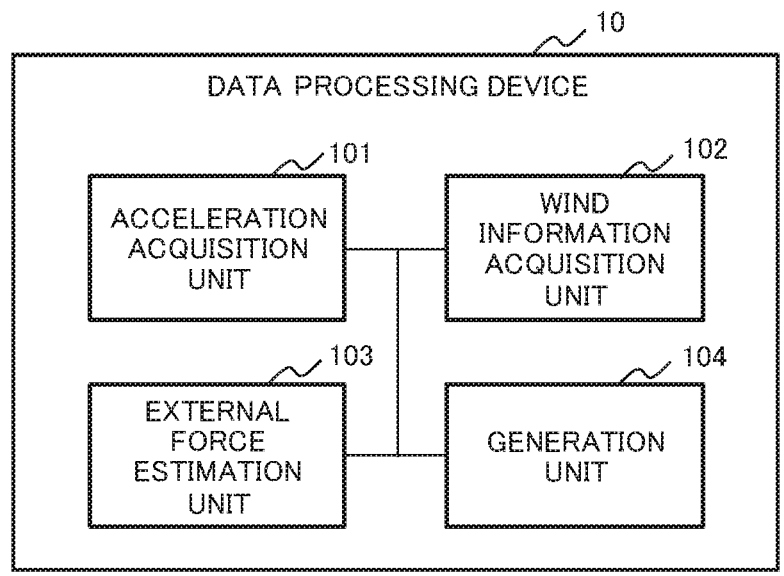
FIG. 11 is a block diagram illustrating a configuration of a data processing device according to a fourth example embodiment of the present invention.

FIG. 11 is a block diagram illustrating a configuration of the data processing device 10. The data processing device 10 includes an acceleration acquisition unit 101, a wind information acquisition unit 102, an external force estimation unit 103, and a generation unit 104.

Data to be processed by the data processing device 10 are data acquired by the moving body 1.

Figure 12:
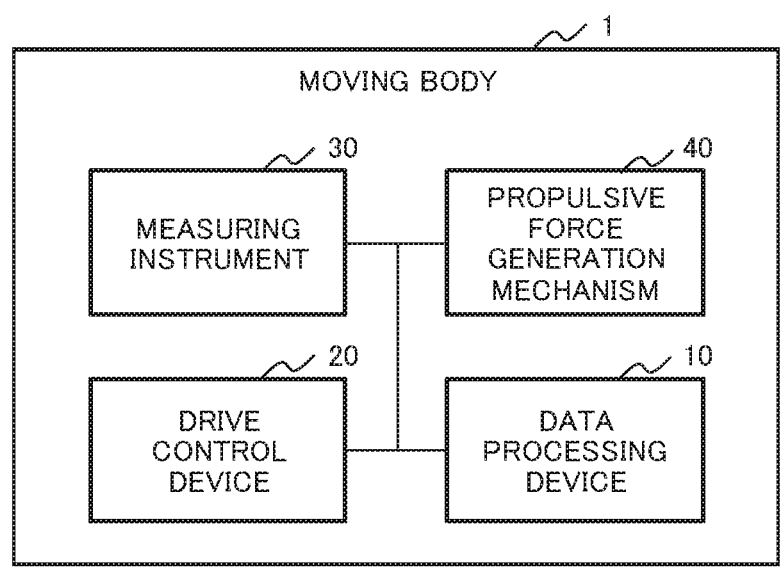
FIG. 12 is a block diagram illustrating a configuration of a moving body according to the fourth example embodiment.

For example, as illustrated in FIG. 12, the data processing device 10 may be mounted on the moving body 1 or may not be mounted on the moving body 1. When the data processing device 10 is not mounted on the moving body 1, an exchange of data with each device mounted on the moving body 1 may be performed in a wireless manner, for example.

The moving body 1 includes a mechanism (propulsive force generation mechanism 40) that generates a propulsive force, and a measuring instrument (measuring instrument 30) that measures strength of at least one direction component of wind the moving body receives. The moving body 1 may further include a drive control device 20.

The moving body 1 may be a flying object that generates the propulsive force in the $^{b}z$ axis direction, such as the flying objects 1a to 1c, and may be the flying object that generates the propulsive force in a direction other than the $^{b}z$ axis direction, such as an airship and an airplane. The moving body 1 may be a device that travels on the ground or across the sea.

The drive control device 20 controls a drive of the propulsive force generation mechanism 40. The drive control device 21 and the drive control device 22 are one example of the drive control device 20.

A function of each unit in the data processing device 10 will be described.

The acceleration acquisition unit 101 acquires acceleration of the moving body 1. One example of the acceleration acquisition unit 101 is the movement calculation unit 114 according to the first to third example embodiments. The acceleration acquisition unit 101 may derive (acquire) acceleration of the moving body by image processing, similarly to the movement calculation unit 114, and may acquire acceleration by another method. For example, the acceleration acquisition unit 101 may acquire acceleration by detecting a change in capacitance, a change in piezoresistance, a change in wavelength of light, or the like by a device generated by using a technique such as micro electro mechanical systems (MEMS).

The wind information acquisition unit 102 acquires the wind information indicating the direction in which wind the moving body 1 receives blows and strength of the wind, which are identified from a value measured by the measuring instrument 30. The wind information acquisition unit 111 according to the first to third example embodiments is one example of the wind information acquisition unit 102.

The external force estimation unit 103 estimates magnitude of an external force the moving body 1 receives from the wind based on the acceleration acquired by the acceleration acquisition unit 101 and a direction and magnitude of the propulsive force generated by the propulsive force generation mechanism 40. The external force is, for example, a difference between a force exerted on the moving body 1 derived based on acceleration and the propulsive force. When gravity also contributes to acceleration of the moving body 1, the external force is a value (or a vector) acquired by further subtracting gravity from the difference. The external force estimation unit 116 is one example of the external force estimation unit 103.

The generation unit 104 generates relationship information indicating a relationship between the strength of the wind the moving body 1 receives and the magnitude of the external force estimated by the external force estimation unit 103. The relationship information may be a data set indicating a correspondence between the wind information and the estimated external force, and may be a value indicating a relationship between the wind information derived based on the data set and the estimated external force. The data storage unit 119 in the first to third example embodiments stores data in a format in which the wind information is associated with the estimated external force, and is thus one example of the generation unit 104. The relationship estimation unit 117 also derives information (such as a value of α, for example) indicating a relationship between the wind information and the estimated external force, and is thus one example of the generation unit 104.

Figure 13:
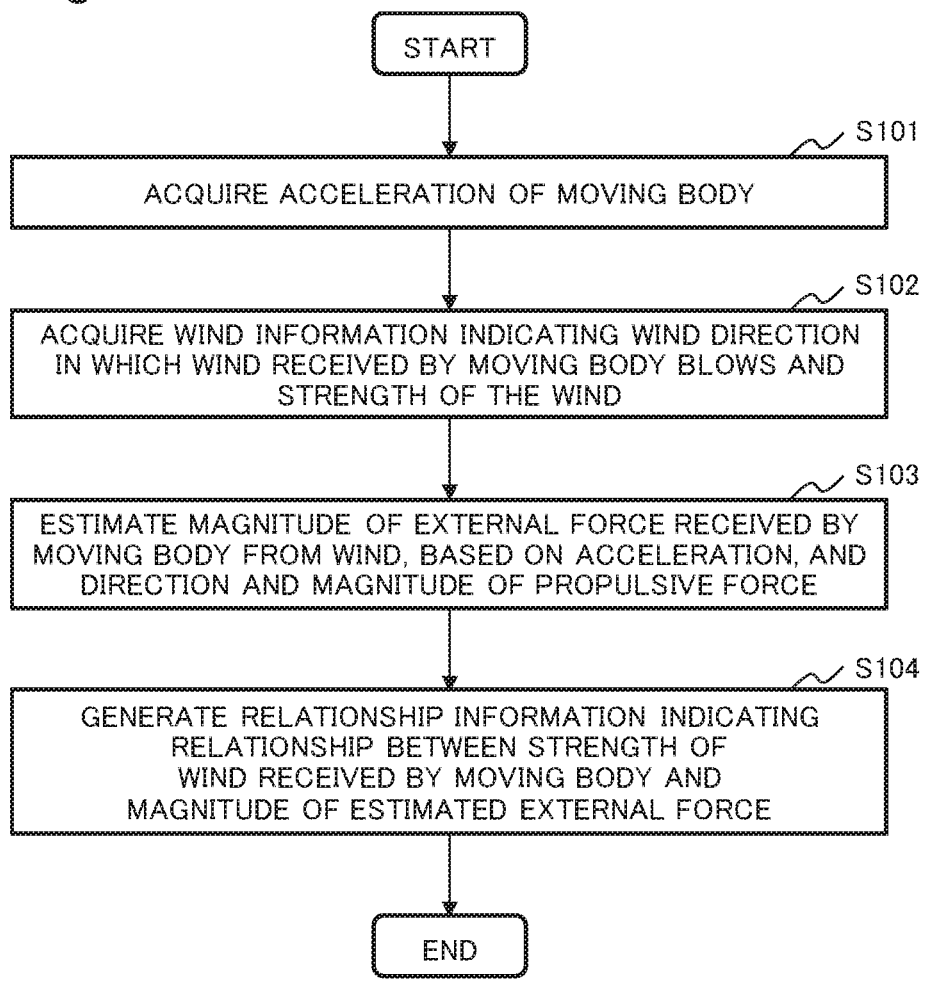
FIG. 13 is a flowchart illustrating one example of a flow of an operation of the data processing device according to the fourth example embodiment.

One example of a flow of an operation of the data processing device 10 will be described with reference to a flowchart in FIG. 13.

The acceleration acquisition unit 101 acquires acceleration of the moving body 1 (Step S101). The wind information acquisition unit 102 acquires the wind information indicating the direction in which wind the moving body 1 receives blows and strength of the wind, which are identified from the value measured by the measuring instrument 30 (Step S102). The external force estimation unit 103 estimates magnitude of the external force the moving body receives from the wind based on the acceleration acquired by the acceleration acquisition unit 101 and the direction and magnitude of the propulsive force generated by the propulsive force generation mechanism 40 (Step S103). The generation unit 104 generates relationship information indicating a relationship between the strength of the wind the moving body 1 receives and the magnitude of the external force estimated by the external force estimation unit 103.

As a modification example, the data processing device 10 may perform the processing in Step S102 before Step S101 or after Step S103.

According to the data processing device 10, an influence of wind on a moving body can be accurately perceived from information acquired from the moving body. A reason for this is that the generation unit 104 generates relationship information indicating a relationship between the external force being estimated based on acceleration and the direction and magnitude of the propulsive force, and wind strength measured by the measuring instrument.

<Configuration of Hardware that Achieves Each Unit of Example Embodiment>

A block representing each of components of each of devices is represented in a functional unit in each of the example embodiments according to the present invention described above. However, the block representing the component may not necessarily mean that each of the components is constituted of a separate module.

Processing of each of the components may be achieved by a computer system, for example, reading and executing a program that causes the computer system to perform the processing. The program is stored in a computer-readable storage medium. The "computer-readable storage medium" is, for example, a portable medium such as an optical disk, a magnetic disk, a magneto-optical disk, and a non-volatile semiconductor memory, and a storage device such as a read only memory (ROM) built in the computer system and a hard disk. The "computer-readable storage medium" also includes a computer-readable storage medium that dynamically holds a program for a short period of time, such as a communication line that transmits a program via a network such as the Internet and a communication line such as a telephone line, and a computer-readable storage medium that temporarily holds a program, such as a volatile memory inside the computer system corresponding to a server and a client in this case. Further, the above-described program may achieve a part of the above-mentioned function, and may further achieve the above-mentioned function by a combination with a program already stored in the computer system.

Figure 14:
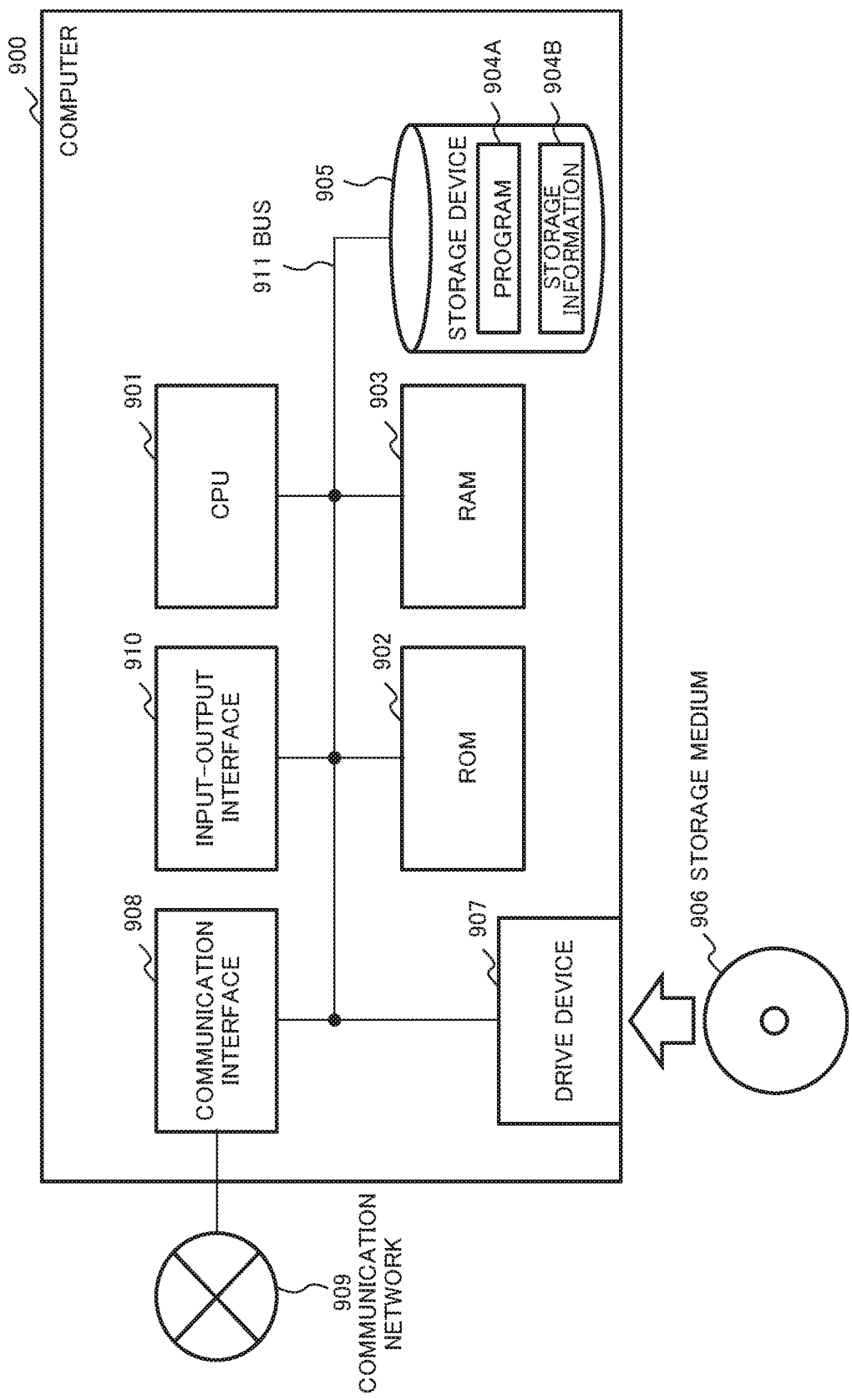
FIG. 14 is a block diagram illustrating an example of hardware constituting each unit included in each of the example embodiments according to the present invention.

The "computer system" is a system including a computer 900 as illustrated in FIG. 14 as one example. The computer 900 includes the following configuration.

One or more central processing units (CPUs) 901
A ROM 902
A random access memory (RAM) 903
A program 904A and storage information 904B loaded into the RAM 903
A storage device 905 that stores the program 904A and the storage information 904B
A drive device 907 that reads and writes a storage medium 906
A communication interface 908 connected to a communication network 909
An input-output interface 910 that inputs and outputs data
A bus 911 that connects components For example, each of the components of each of the devices in each of the example embodiments is achieved by the CPU 901 loading the program 904A that achieves a function of the component into the RAM 903 and executing the program 904A. The program 904A that achieves a function of each of the components of each of the devices is previously stored in the storage device 905 and the ROM 902, for example. Then, the CPU 901 reads the program 904A as necessary. The storage device 905 is, for example, a hard disk. The program 904A may be supplied to the CPU 901 via the communication network 909, or may be previously stored in the storage medium 906 and read by the drive device 907 to be supplied to the CPU 901. Note that, the storage medium 906 is, for example, the portable medium such as the optical disk, the magnetic disk, the magneto-optical disk, and the non-volatile semiconductor memory.

A method of achieving each of the devices has various modification examples. For example, each of the devices may be achieved by a possible combination of each separate computer 900 and a program for each component. Alternatively, a plurality of components provided in each of the devices may be achieved by an arbitrary combination of one information processing device 900 and a program.

A part or the whole of each of the components of each of the devices may be achieved by another general-purpose or dedicated circuit, a computer, and the like, or achieved by a combination thereof. A part or the whole of each of the components may be formed by a single chip or formed by a plurality of chips connected to one another via a bus.

When a part or the whole of each of the components of each of the devices is achieved by a plurality of computers, circuits, or the like, the plurality of computers, circuits, or the like may be arranged in a concentrated manner or a distributed manner. For example, the computer, the circuitry, and the like may be achieved as a form in which each is connected via a communication network, such as a client server system or a cloud computing system.

A part or the entirety of the above-described example embodiments may be described as the following supplementary notes, but are not limited to the following.

<<Supplementary Note>>

[Supplementary Note 1]

A data processing device, includes:

an acceleration acquisition unit that acquires acceleration of a moving body, the moving body including a mechanism that generates a propulsive force, and a measuring instrument that measures strength of at least one direction component of wind received by the moving body;

a wind information acquisition unit that acquires wind information about a wind direction and a wind strength, the wind direction and the wind strength being specified by using a measured value measured by the measuring instrument;

an external force estimation unit that estimates magnitude of an external force based on the acceleration, and a direction and magnitude of the propulsive force, the external force being force that the moving body receives from the wind; and a generation unit that generates relationship information, the relationship information being an information about a relationship between the wind strength and the estimated magnitude of the external force.

[Supplementary Note 2]

The data processing device according to supplementary note 1, further includes a measurement condition control unit that controls an attitude of the moving body in such a way as to include the direction of the propulsive force in a plane including the wind direction and a direction of gravity.

[Supplementary Note 3]

The data processing device according to supplementary note 2, wherein the measurement condition control unit controls the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

[Supplementary Note 4]

The data processing device according to supplementary note 1, wherein the acceleration acquisition unit estimates an amount of movement of the moving body based on an image captured by an image device mounted on the moving body, and estimates the acceleration based on the estimated amount of movement.

[Supplementary Note 5]

The data processing device according to supplementary note 4, further includes a measurement condition control unit that controls an attitude of the moving body in such a way as to set an image capturing direction of the image device to a direction perpendicular to the wind direction.

[Supplementary Note 6]

The data processing device according to any one of supplementary notes 1 to 5, further includes a parameter correction unit that corrects at least one parameter based on the relationship information, the at least one parameter being used in calculation performed by at least one of the wind information acquisition unit and the external force estimation unit.

[Supplementary Note 7]

A drive control device, includes:

a propulsive vector derivation unit that acquires, from the data processing device according to any one of supplementary notes 1 to 6, the wind information and the relationship information with respect to the wind that the moving body receives, and deriving the magnitude and the direction of the propulsive force of the moving body based on the wind information and the relationship information in such a way as to reduce an influence of the wind on the acceleration; and a control signal generation unit that generates a control signal to control the mechanism in order to set the magnitude and the direction of the propulsive force of the moving body to the derived magnitude and the direction of the propulsive force by the propulsive vector derivation unit.

[Supplementary Note 8]

The drive control device according to supplementary note 7, wherein the data processing device further includes a relationship estimation unit that derives, as the relationship information, a value indicating a relationship between the wind strength and a force that the moving body receives from the wind, and the propulsive vector derivation unit derives the magnitude and the direction of the propulsive force by using the value in a status where the acceleration is the smallest.

[Supplementary Note 9]

A moving body, includes the data processing device according to any one of supplementary notes 1 to 6.

[Supplementary Note 10]

The moving body according to supplementary note 9, further includes the drive control device according to supplementary note 7 or 8.

[Supplementary Note 11]

A data processing method, includes:

acquiring acceleration of a moving body, the moving body including a mechanism that generates a propulsive force and a measuring instrument that measures strength of at least one direction component of wind received by the moving body;

acquiring wind information about a wind direction and a wind strength, the wind direction and the wind strength being specified by using a measured value measured by the measuring instrument;

estimating magnitude of an external force based on the acceleration, and a direction and magnitude of the propulsive force, the external force being force that the moving body receives from the wind; and generating relationship information, the relationship information being an information about a relationship between the wind strength and the estimated magnitude of the external force.

[Supplementary Note 12]

The data processing method according to supplementary note 11, further includes controlling an attitude of the moving body in such a way as to include the direction of the propulsive force in a plane including the wind direction and a direction of gravity.

[Supplementary Note 13]

The data processing method according to supplementary note 12, further includes controlling the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

[Supplementary Note 14]

The data processing method according to supplementary note 11, further includes estimating an amount of movement of the moving body based on an image captured by an image device mounted on the moving body, and estimating the acceleration based on the estimated amount of movement.

[Supplementary Note 15]

The data processing method according to supplementary note 14, further includes controlling an attitude of the moving body in such a way as to set an image capturing direction of the image device to a direction perpendicular to the wind direction.

[Supplementary Note 16]

The data processing method according to any one of supplementary notes 11 to 15, further includes correcting at least one parameter based on the relationship information, the at least one parameter being used in calculation to derive at least any of the wind information and magnitude of the external force.

[Supplementary Note 17]

A drive control method, includes:

acquiring, from the data processing device according to any one of supplementary notes 1 to 6, the wind information and the relationship information with respect to the wind that the moving body receives, and deriving the magnitude and the direction of the propulsive force of the moving body based on the wind information and the relationship information in such a way as to reduce an influence of the wind on the acceleration; and generating a control signal to control the mechanism in order to set the magnitude and the direction of the propulsive force of the moving body to the derived magnitude and the direction of the propulsive force.

[Supplementary Note 18]

The drive control method according to supplementary note 17, wherein the data processing device further includes a relationship estimation unit that derives, as the relationship information, a value indicating a relationship between the wind strength and a force that the moving body receives from the wind, and the drive control method derives the magnitude and the direction of the propulsive force by using the value in a status where the acceleration is the smallest.

[Supplementary Note 19]

A non-transitory computer-readable storage medium that stores a program causing a computer to execute:

acquiring acceleration of a moving body, the moving body including a mechanism that generates a propulsive force and a measuring instrument that measures strength of at least one direction component of wind received by the moving body;

acquiring wind information about a wind direction and a wind strength, the wind direction and the wind strength being specified by using a measured value measured by the measuring instrument;

estimating magnitude of an external force based on the acceleration, and a direction and magnitude of the propulsive force, the external force being force that the moving body receives from the wind; and generating relationship information, the relationship information being an information about a relationship between the wind strength and the estimated magnitude of the external force.

[Supplementary Note 20]

The non-transitory computer-readable storage medium according to supplementary note 19, wherein the program causes the computer to further execute:

controlling an attitude of the moving body in such a way as to include the direction of the propulsive force in a plane including the wind direction and a direction of gravity.

[Supplementary Note 21]

The non-transitory computer-readable storage medium according to supplementary note 20, wherein the program causes the computer to further execute:

controlling the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

[Supplementary Note 22]

The non-transitory computer-readable storage medium according to supplementary note 19, wherein the program causes the computer to further execute:

estimating an amount of movement of the moving body based on an image captured by an image device mounted on the moving body, and estimating the acceleration based on the estimated amount of movement.

[Supplementary Note 23]

The non-transitory computer-readable storage medium according to supplementary note 22, wherein the program causes the computer to further execute:

controlling an attitude of the moving body in such a way as to set an image capturing direction of the image device to a direction perpendicular to the wind direction.

[Supplementary Note 24]

The non-transitory computer-readable storage medium according to any one of supplementary notes 19 to 23, wherein the program causes the computer to further execute:

correcting at least one parameter based on the relationship information, the at least one parameter being used in calculation to derive at least any of the wind information and magnitude of the external force.

[Supplementary Note 25]

A non-transitory computer-readable storage medium that stores a program causing a computer to execute:

acquiring, from the data processing device according to any one of supplementary notes 1 to 6, the wind information and the relationship information with respect to the wind that the moving body receives, and deriving the magnitude and the direction of the propulsive force of the moving body based on the wind information and the relationship information in such a way as to reduce an influence of the wind on the acceleration; and generating a control signal to control the mechanism in order to set the magnitude and the direction of the propulsive force of the moving body to the derived magnitude and the direction of the propulsive force.

[Supplementary Note 26]

The non-transitory computer-readable storage medium according to supplementary note 25, wherein the data processing device further includes a relationship estimation unit that derives, as the relationship information, a value indicating a relationship between the wind strength and a force that the moving body receives from the wind, and in a processing to derive propulsive vector, the magnitude and the direction of the propulsive force are derived by using the value in a status where the acceleration is the smallest.

The present invention is not limited to the example embodiments described above. Various modifications that can be understood by those skilled in the art can be made to the configuration and the details of the claimed invention within the scope of the claimed invention.

REFERENCE SIGNS LIST

1 Moving body
1a, 1b, 1c Flying object
2 Rotor blade
3 Housing
5 Wind sensor
8 Image device
9 Actuator
10, 11, 12 Data processing device
20, 21, 22 Drive control device
30 Measuring instrument
40 Propulsive force generation mechanism
101 Acceleration acquisition unit
102 Wind information acquisition unit
103 External force estimation unit
104 Generation unit
110 Measurement condition control unit
111 Wind information acquisition unit
112 Propulsive force identification unit
113 Attitude identification unit
114 Movement calculation unit
115 Resultant calculation unit
116 External force estimation unit
117 Relationship estimation unit
119 Data storage unit 128 Parameter correction unit
211 Control signal generation unit
222 Propulsive vector derivation unit
900 Computer
901 CPU
902 ROM
903 RAM
904A Program
904B Storage information
905 Storage device
906 Storage medium
907 Drive device
908 Communication interface
909 Communication network
910 Input-output interface
911 Bus

What is claimed is:

1. A data processing device, comprising:
a memory; and
at least one processor that is coupled to the memory and is configured to:
control an attitude of a moving body, the moving body including a mechanism that generates a propulsive force, and a measuring instrument that measures strength of at least one direction component of wind received by the moving body, in such a way as to set an image capturing direction of an image device to a direction perpendicular to wind direction;
acquire acceleration of the moving body, by estimating an amount of movement of the moving body based on an image captured by the image device mounted on the moving body and estimating the acceleration based on the estimated amount of movement;
acquire wind information about a wind direction and a wind strength, the wind direction and the wind strength being specified by using a measured value measured by the measuring instrument;
estimate magnitude of an external force based on the acceleration, and a direction and magnitude of the propulsive force, the external force being force that the moving body receives from the wind; and
generate relationship information, the relationship information being an information about a relationship between the wind strength and the estimated magnitude of the external force.

2. The data processing device according to claim 1, wherein the at least one processor is further configured to:
control an attitude of the moving body in such a way as to include the direction of the propulsive force in a plane including the wind direction and a direction of gravity.

3. The data processing device according to claim 2, wherein
the at least one processor controls the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

4. The data processing device according to claim 1, wherein the at least one processor is further configured to:
correct at least one parameter based on the relationship information, the at least one parameter being used in calculation to acquire the wind information and estimate magnitude of an external force.

5. A drive control device, comprising:
a memory; and
at least one processor that is coupled to the memory and is configured to:
acquire, from the data processing device according to claim 1, the wind information and the relationship information with respect to the wind that the moving body receives, and
derive the magnitude and the direction of the propulsive force of the moving body based on the wind information and the relationship information in such a way as to reduce an influence of the wind on the acceleration; and
generate a control signal to control the mechanism in order to set the magnitude and the direction of the propulsive force of the moving body to the derived magnitude and the direction of the propulsive force.

6. The drive control device according to claim 5, wherein the at least one processor
derives, as the relationship information, a value indicating a relationship between the wind strength and a force that the moving body receives from the wind, and
derives the magnitude and the direction of the propulsive force by using the value in a status where the acceleration is the smallest.

7. A data processing method, comprising:
by at least one processor,
controlling an attitude of a moving body, the moving body including a mechanism that generates a propulsive force and a measuring instrument that measures strength of at least one direction component of wind received by the moving body, in such a way as to set an image capturing direction of an image device to a direction perpendicular to wind direction;
acquiring acceleration of the moving body, by estimating an amount of movement of the moving body based on an image captured by the image device mounted on the moving body, and estimating the acceleration based on the estimated amount of movement;
acquiring wind information about a wind direction and a wind strength, the wind direction and the wind strength being specified by using a measured value measured by the measuring instrument;
estimating magnitude of an external force based on the acceleration, and a direction and magnitude of the propulsive force, the external force being force that the moving body receives from the wind; and
generating relationship information, the relationship information being an information about a relationship between the wind strength and the estimated magnitude of the external force.

8. The data processing method according to claim 7, further comprising
by the at least one processor,
controlling an attitude of the moving body in such a way as to include the direction of the propulsive force in a plane including the wind direction and a direction of gravity.

9. The data processing method according to claim 8, further comprising
by the at least one processor,
controlling the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

10. The data processing method according to claim 7, further comprising by the at least one processor, correcting at least one parameter based on the relationship information, the at least one parameter being used in calculation to derive at least any of the wind information and magnitude of the external force.

11. A non-transitory computer-readable storage medium that stores a program causing a computer to execute:

controlling an attitude of a moving body, the moving body including a mechanism that generates a propulsive force and a measuring instrument that measures strength of at least one direction component of wind received by the moving body, in such a way as to set an image capturing direction of an image device to a direction perpendicular to wind direction;

acquiring acceleration of the moving body by estimating an amount of movement of the moving body based on an image captured by the image device mounted on the moving body, and estimating the acceleration based on the estimated amount of movement;

acquiring wind information about a wind direction and a wind strength, the wind direction and the wind strength being specified by using a measured value measured by the measuring instrument;

estimating magnitude of an external force based on the acceleration, and a direction and magnitude of the propulsive force, the external force being force that the moving body receives from the wind; and generating relationship information, the relationship information being an information about a relationship between the wind strength and the estimated magnitude of the external force.

12. The non-transitory computer-readable storage medium according to claim 11, wherein the program causes the computer to further execute:

controlling an attitude of the moving body in such a way as to include the direction of the propulsive force in a plane including the wind direction and a direction of gravity.

13. The non-transitory computer-readable storage medium according to claim 12, wherein the program causes the computer to further execute:

controlling the attitude of the moving body in such a way as to set the attitude of the moving body to an attitude that maximizes the measured value by the measuring instrument among attitudes that may be taken by rotating the moving body about a first axis that is not parallel to a measurement direction of the measuring instrument.

14. The non-transitory computer-readable storage medium according to claim 11, wherein the program causes the computer to further execute:

correcting at least one parameter based on the relationship information, the at least one parameter being used in calculation to derive at least any of the wind information and magnitude of the external force.

* * * * *